United States Patent
Chen et al.

(10) Patent No.: US 12,401,819 B2
(45) Date of Patent: *Aug. 26, 2025

(54) IMAGE DECODING AND ENCODING METHOD AND APPARATUS BASED ON UNITS OF A SAME MOTION PREDICTION MODE OBTAINED BY TWO INDEPENDENT SEQUENCES

(71) Applicant: HUAWEI TECHNOLOGIES CO., LTD., Guangdong (CN)

(72) Inventors: Huanbang Chen, Shenzhen (CN); Sixin Lin, Shenzhen (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

This patent is subject to a terminal disclaimer.

(21) Appl. No.: 17/843,030

(22) Filed: Jun. 17, 2022

(65) Prior Publication Data
US 2022/0329845 A1    Oct. 13, 2022

Related U.S. Application Data

(63) Continuation of application No. 17/017,490, filed on Sep. 10, 2020, now Pat. No. 11,394,994, which is a (Continued)

(30) Foreign Application Priority Data

Feb. 6, 2016    (CN) .......................... 201610081070.3

(51) Int. Cl.
H04N 19/52    (2014.01)
H04N 19/105    (2014.01)
(Continued)

(52) U.S. Cl.
CPC ........... *H04N 19/52* (2014.11); *H04N 19/105* (2014.11); *H04N 19/124* (2014.11);
(Continued)

(58) Field of Classification Search
CPC .... H04N 19/52; H04N 19/105; H04N 19/124; H04N 19/139; H04N 19/157; H04N 19/176; H04N 19/521
(Continued)

(56) References Cited

U.S. PATENT DOCUMENTS 10,798,403 B2 *   10/2020   Ikai .................. H04N 19/52
10,798,405 B2     10/2020   Chen et al.
(Continued)

FOREIGN PATENT DOCUMENTS

AU    2015407876    6/2019
CN    1254238       5/2000
(Continued)

OTHER PUBLICATIONS

Chen et al., "Algorithm Description of Joint Exploration Test Model 3," Joint Video Exploration Team (JVET) of ITU-T SG 16 WP 3 and ISO/IEC JTC 1/SC 29/WG 11, 3rd Meeting: Geneva, May 26-Jun. 1, 2016, 35 pages.
(Continued)

*Primary Examiner* — Richard A Hansell, Jr.
(74) *Attorney, Agent, or Firm* — Fish & Richardson P.C.

(57) ABSTRACT

Image encoding and decoding methods, apparatuses and computer-readable media are described. An example decoding method include: determining a first decoded unit from two decoded units on a left side of a to-be-decoded unit and a second decoded unit from three decoded units above the to-be-decoded unit; calculating first and second motion vector predictors (MVPs) of M control points of the to-be-decoded unit based on motion vectors of control points of
(Continued)

the first and the second decoded units, respectively; generating a first and a second motion vector group based on the first and the second MVPs of the M control points, respectively; determining a target motion vector group from motion vector groups comprising the first motion vector group and the second motion vector group; and predicting the to-be-decoded unit based on the target motion vector group.

30 Claims, 6 Drawing Sheets

Related U.S. Application Data continuation of application No. 16/054,306, filed on Aug. 3, 2018, now Pat. No. 10,798,405, which is a continuation of application No. PCT/CN2016/098403, filed on Sep. 8, 2016.

(51) Int. Cl.
| | | |
|---|---|---|
| H04N 19/124 | (2014.01) | |
| H04N 19/139 | (2014.01) | |
| H04N 19/157 | (2014.01) | |
| H04N 19/176 | (2014.01) | |
| H04N 19/513 | (2014.01) | |

(52) U.S. Cl.
CPC ......... *H04N 19/139* (2014.11); *H04N 19/157* (2014.11); *H04N 19/176* (2014.11); *H04N 19/521* (2014.11)

(58) Field of Classification Search
USPC .................................................. 375/240.16
See application file for complete search history.

(56) References Cited

U.S. PATENT DOCUMENTS

| | | | | |
|---|---|---|---|---|
| 11,006,106 | B2* | 5/2021 | Liu ....................... | H04N 19/139 |
| 11,363,274 | B2 | 6/2022 | Chen et al. | |
| 11,394,994 | B2 | 7/2022 | Chen et al. | |
| 11,412,248 | B2 | 8/2022 | Chen et al. | |
| 2007/0171969 | A1 | 7/2007 | Han et al. | |
| 2008/0310512 | A1 | 12/2008 | Ye et al. | |
| 2010/0194932 | A1 | 8/2010 | Mitsuya et al. | |
| 2011/0013695 | A1 | 1/2011 | Endo | |
| 2011/0228853 | A1 | 9/2011 | Suzuki et al. | |
| 2012/0147966 | A1 | 6/2012 | Lee et al. | |
| 2012/0213288 | A1 | 8/2012 | Kitaura et al. | |
| 2012/0275522 | A1 | 11/2012 | Kim et al. | |
| 2013/0039426 | A1* | 2/2013 | Helle ..................... | H04N 19/52 |
| | | | | 375/E7.256 |
| 2014/0126643 | A1 | 5/2014 | Park et al. | |
| 2014/0301446 | A1 | 10/2014 | Maeda | |
| 2015/0256849 | A1 | 9/2015 | Kim et al. | |
| 2016/0182907 | A1 | 6/2016 | Lim et al. | |
| 2016/0294711 | A1 | 10/2016 | Lv et al. | |
| 2017/0347116 | A1 | 11/2017 | Lv et al. | |
| 2018/0192047 | A1 | 7/2018 | Lv et al. | |
| 2019/0028731 | A1* | 1/2019 | Chuang ................ | H04N 19/176 |
| 2019/0037231 | A1 | 1/2019 | Ikai et al. | |
| 2019/0098314 | A1 | 3/2019 | Gisquet et al. | |
| 2020/0252645 | A1 | 8/2020 | Chen et al. | |
| 2022/0014754 | A1* | 1/2022 | Liang .................. | H04N 19/159 |
| 2022/0329845 | A1 | 10/2022 | Chen et al. | |
| 2025/0119568 | A1* | 4/2025 | Lee ....................... | H04N 19/52 |

FOREIGN PATENT DOCUMENTS

| | | |
|---|---|---|
| CN | 101771878 | 7/2010 |
| CN | 102783151 | 11/2012 |
| CN | 103039075 | 4/2013 |
| CN | 103370939 | 10/2013 |
| CN | 104539966 | 4/2015 |
| CN | 104661031 | 5/2015 |
| CN | 104717555 | 6/2015 |
| CN | 105072449 | 11/2015 |
| CN | 105163116 | 12/2015 |
| CN | 111526361 | 8/2020 |
| EP | 2252067 | 11/2010 |
| EP | 2683165 | 1/2014 |
| JP | 2012165279 | 8/2012 |
| JP | 2013502141 | 1/2013 |
| JP | 2014506439 | 3/2014 |
| JP | 2020144911 | 9/2020 |
| JP | 2020144912 | 9/2020 |
| JP | 2020205610 | 12/2020 |
| JP | 2020205611 | 12/2020 |
| RU | 2355126 | 7/2007 |
| WO | 2011099428 | 8/2011 |
| WO | 2013069231 | 5/2013 |
| WO | 2014190468 | 12/2014 |
| WO | 2015023689 | 2/2015 |
| WO | 2016008157 | 1/2016 |
| WO | 2017036045 | 3/2017 |

OTHER PUBLICATIONS

Extended European Search Report issued in European Application 16889054.9 on Oct. 4, 2018, 8 pages.

Huang et al., "Affine Skip and Direct Modes for Efficient Video Coding," 2012 Visual Communications and Image Processing, date added to IEEE Xplore: Jan. 17, 2013, 6 pages.

Huang et al., "Control-Point Representation and Differential Coding Affine-Motion Compensation," IEEE Transactions on Circuits and Systems for Video Technology, vol. 23, No. 10, Oct. 2013, 10 pages.

Huawei Technologies Co. Ltd., "Affine Transform Prediction for Next Generation Video Coding," International Telecommunication Union, Telecommunication Standardization Sector, Study Period 2013-2016, COM16-C1016 R1-E, Sep. 2015, 11 pages.

ITU-T H.264, "Series H: Audiovisual and Multimedia Systems—Infrastructure of Audiovisual Services—Coding of Moving Video Advanced Video Coding for Generic Audiovisual Services," Feb. 2016, 807 pages.

Lin et al., "Affine Transfonn Prediction for Next Generation Video Coding," International Organization for Standardization: ISO/IEC JTC1/SC29/WG11 MPEG2015/m37525; Geneva, Switzerland, Oct. 2015, 10 pages.

Office Action issued in Australian Application No. 2020207857 on Jun. 24, 2021, 10 pages.

Office Action issued in Chinese Application No. 201610081070.3 on Jun. 4, 2019, 30 pages (with English translation).

Office Action issued in Chinese Application No. 202010262560.X on Oct. 28, 2021, 12 pages (with English translation).

Office Action issued in Chinese Application No. 202010262939.0 on Oct. 28, 2021, 10 pages (with English translation).

Office Action issued in Japanese Application No. 2018-541193 on Aug. 27, 2019, 14 pages (with English translation).

Office Action issued in Japanese Application No. 2020-144911 on Nov. 2, 2021, 17 pages (with English translation).

Office Action issued in Japanese Application No. 2020-144912 on Nov. 2, 2021, 16 pages (with English translation).

Office Action issued in Korean Application No. 2021-7023755 on Sep. 14, 2021, 7 pages (with English translation).

Office Action issued in Russian Application No. 2018131317 on May 16, 2019, 13 pages (with English translation).

Office Action issued in Russian Application No. 2020117128/07(028573) on Sep. 21, 2020, 39 pages (with English translation).

Okuboh et al., "H.265/HEVC Textbook," First edition, Chapter 5.5, Oct. 21, 2013, 4 pages (with English abstract).

PCT International Search Report and Written Opinion issued in International Application No. PCT/CN2016/098403 dated Nov. 30, 2016, 8 pages.

PCT International Search Report issued in International Application PCT/CN2016/098403 on Nov. 30, 2016, 4 pages.

(56) References Cited

OTHER PUBLICATIONS

PCT Written Opinion of the International Searching Authority issued in International Application No. PCT/CN2016/098403 dated Nov. 30, 2016, 5 pages.
Video/JVET, "Algorithm Description of Joint Exploration Test Model 1 (JEM 1)," International Organization for Standardization; ISO/IEC JTC1/SC29/WG11/N15790; Geneva, CH, Oct. 2015, 27 pages.

* cited by examiner

Determine N encoded units from adjacent encoded units of a to-be-encoded unit according to a first preset rule, where a motion prediction mode of the N encoded units is the same as that of the to-be-encoded unit ~ S101

Generate an $n^{th}$ motion vector group by using a first preset algorithm and based on a motion vector of an $n^{th}$ encoded unit, where n is any positive integer not greater than N ~ S102

Determine, from obtained N motion vector groups according to a second preset rule, one motion vector group as an optimal motion vector group ~ S103

Determine a prediction sample value of each sample unit in the to-be-encoded unit by using a second preset algorithm and based on the optimal motion vector group ~ S104

Determine a prediction residual of each sample unit based on a difference between an original sample value of each sample unit and the prediction sample value of each sample unit ~ S105

Encode the prediction residual of each sample unit and an index identifier of the optimal motion vector group, to obtain a bitstream corresponding to the to-be-encoded unit, where the index identifier of the optimal motion vector group is used to instruct a decoding apparatus to determine the prediction sample value of each sample unit ~ S106

FIG. 1

IMAGE DECODING AND ENCODING METHOD AND APPARATUS BASED ON UNITS OF A SAME MOTION PREDICTION MODE OBTAINED BY TWO INDEPENDENT SEQUENCES

CROSS-REFERENCE TO RELATED APPLICATIONS

This application is a continuation of U.S. patent application Ser. No. 17/017,490, filed on Sep. 10, 2020, which is a continuation of U.S. patent application Ser. No. 16/054,306, filed on Aug. 3, 2018, now U.S. Pat. No. 10,798,405, which is a continuation of International Application No. PCT/CN2016/098403, filed on Sep. 8, 2016. The International Application claims priority to Chinese Patent Application No. 201610081070.3, filed on Feb. 6, 2016. All of the afore-mentioned patent applications are hereby incorporated by reference in their entireties.

TECHNICAL FIELD

Embodiments of the present invention relate to image processing technologies, and in particular to an image encoding method and apparatus and an image decoding method and apparatus.

BACKGROUND

Video multimedia applications, such s video conferencing, video surveillance, and web television are widely applied in life and work. Therefore, increasingly high requirements are imposed on video image quality, video image transmission, and video image storage and an image encoding technology emerges accordingly. In the image encoding technology, video image data can be encoded to reduce redundant information of the video image data, facilitate video image transmission and storage, and ensure video image quality.

In an existing image encoding method, an encoding scheme based on intra-frame prediction (Intra-frame Prediction) may be used. A motion vector of a to-be-encoded unit is determined based on a motion vector of an adjacent encoded unit of the to-be-encoded unit, and a prediction sample value of the to-be-encoded unit is determined based on the motion vector of the to-be-encoded unit. Further, a residual between an original sample value of the to-be-encoded unit and the prediction sample value is encoded, to obtain a bitstream of the to-be-encoded unit.

A motion correlation between the adjacent encoded unit and the to-be-encoded unit also causes impact on the motion vector of the to-be-encoded unit. Therefore, the motion vector of the to-be-encoded unit that is determined in the existing image encoding method is not accurate enough, resulting in relatively low accuracy of image encoding.

SUMMARY

Embodiments of the present invention provide an image encoding method and apparatus and an image decoding method and apparatus, to improve accuracy of image encoding and decoding.

An embodiment of the present invention provides an image encoding method, including:

determining N encoded units from adjacent encoded units of a to-be-encoded unit according to a first preset rule, where a motion prediction mode of the N encoded units is the same as that of the to-be-encoded unit, and N is a positive integer;

generating an $n^{th}$ motion vector group by using a first preset algorithm and based on a motion vector of an $n^{th}$ encoded unit, where n comprises any positive integer not greater than N;

determining, from obtained N motion vector groups according to a second preset rule, one motion vector group as an optimal motion vector group;

determining a prediction sample value of each sample unit in the to-be-encoded unit by using a second preset algorithm and based on the optimal motion vector group;

determining a prediction residual of each sample unit based on a difference between an original sample value of each sample unit and the prediction sample value of each sample unit; and encoding the prediction residual of each sample unit and an index identifier of the optimal motion vector group, to obtain a bitstream corresponding to the to-be-encoded unit, where the index identifier of the optimal motion vector group is used to instruct a decoding apparatus to determine the prediction sample value of each sample unit.

Optionally, the generating an $n^{th}$ motion vector group by using a first preset algorithm and based on a motion vector of an $n^{th}$ encoded unit may include:

determining motion vector predictors of M control points of the to-be-encoded unit by using the first preset algorithm and based on the motion vector of the $n^{th}$ encoded unit, sample coordinates of the $n^{th}$ encoded unit, and sample coordinates of the M control points; and generating the $n^{th}$ motion vector group based on the motion vector predictors of the M control points, where M is a positive integer determined based on the motion prediction mode of the to-be-encoded unit.

Optionally; the M control points include an upper-left vertex and an upper-right vertex of the to-be-encoded unit; and the determining motion vector predictors of M control points of the to-be-encoded unit by using the first preset algorithm and based on the motion vector of the $n^{th}$ encoded unit, sample coordinates of the $n^{th}$ encoded unit, and sample coordinates of the M control points includes:

determining a motion vector predictor $(v_{x0}, v_{y0})$ of the upper-left vertex of the to-be-encoded unit by using the following formula (1) and based on a motion vector $(v_{x2}, v_{y2})$ of an upper-left vertex of the $n^{th}$ encoded unit, a motion vector $(v_{x3}, v_{y3})$ of an upper-right vertex of the $n^{th}$ encoded unit, a motion vector $(v_{x4}, v_{y4})$ of a lower-left vertex of the $n^{th}$ encoded unit, sample coordinates $(x_2, y_2)$ of the upper-left vertex of the $n^{th}$ encoded unit, sample coordinates $(x_3, y_3)$ of the upper-right vertex of the $n^{th}$ encoded unit, sample coordinates $(x_4, y_4)$ of the lower-left vertex of the $n^{th}$ encoded unit, and sample coordinates $(x_0, y_0)$ of the upper-left vertex of the to-be-encoded unit:

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \quad \text{formula (1)}$$

and determining a motion vector predictor $(v_{x1}, v_{y1})$ of the upper-right vertex of the to-be-encoded unit by using the following formula (2) and based on the motion vector $(v_{x2}, v_{y2})$ of the upper-left vertex of the $n^{th}$ encoded unit, the motion vector $(v_{x3}, v_{y3})$ of the upper-right vertex of the $n^{th}$ encoded unit, the sample coordinates $(x_1, y_2)$ of the upper-left vertex of the $n^{th}$ encoded unit, the sample coordinates $(x_3, y_3)$ of the upper-right vertex of the $n^{th}$ encoded unit, the motion vector predictor $(v_{x0}, v_{y0})$ of the upper-left vertex of the to-be-encoded unit, the sample coordinates $(x_0, y_0)$ of the upper-left vertex of the to-be-encoded unit, and sample coordinates $(x_1, y_1)$ of the upper-left vertex of the to-be-encoded unit:

$$\begin{cases} v_{x1} = v_{x0} + \dfrac{(x_1 - x_0) \times (v_{x3} - v_{x2})}{(x_3 - x_2)} \\ v_{y1} = v_{y0} + \dfrac{(x_1 - x_0) \times (v_{y3} - v_{y2})}{(x_3 - x_2)} \end{cases} \quad \text{formula (2)}$$

Optionally, the determining, from obtained N motion vector groups according to a second preset rule, one motion vector group as an optimal motion vector group may include:

sorting the N motion vector groups according to a preset sorting rule, to generate a candidate motion vector queue;

if N is greater than or equal to a preset value, determining a preset quantity of motion vector groups in the front of the candidate motion vector queue;

determining a matching error between each of the preset quantity of motion vector groups in the front and the to-be-encoded unit; and determining one motion vector group with a smallest matching error as the optimal motion vector group.

Optionally, the preset sorting rule includes a descending order of the N encoded units.

Optionally, the determining, from obtained N motion vector groups according to a second preset rule, one motion vector group as an optimal motion vector group may include:

sorting the N motion vector groups according to a preset sorting rule;

if N is less than a preset value, generating Q motion vector groups, where a sum of N and Q is greater than or equal to the preset value, and Q is a positive integer;

adding the Q motion vector groups to the end of the N motion vector groups, to generate a candidate motion vector queue;

determining a preset quantity of motion vector groups in the front of the candidate motion vector queue;

determining a matching error between each of the preset quantity of motion vector groups in the front and the to-be-encoded unit; and determining one motion vector group with a smallest matching error as the optimal motion vector group.

Optionally, the generating Q motion vector groups may include:

determining, from the adjacent encoded units, an encoded unit corresponding to an $m^{th}$ control point in the to-be-encoded unit, where a distance between the encoded unit corresponding to the $m^{th}$ control point and the $m^{th}$ control point is less than or equal to a preset distance, and m comprises any positive integer not greater than M;

determining a motion vector of the encoded unit corresponding to the $m^{th}$ control point as a motion vector predictor of the $m^{th}$ control point; and generating the Q motion vector groups based on the motion vector predictors of the M control points.

Alternatively, the generating Q motion vector groups may include:

determining, from the adjacent encoded units, an encoded unit corresponding to an $m^{th}$ control point in the to-be-encoded unit, where a distance between the encoded unit corresponding to the $m^{th}$ control point and the $m^{th}$ control point is less than or equal to a preset distance, and m comprises any positive integer not greater than M;

determining a motion vector of the encoded unit corresponding to the $m^{th}$ control point as a first motion vector predictor of the $m^{th}$ control point;

generating K first motion vector groups based on first motion vector predictors of the M control points;

determining a motion vector of a $j^{th}$ encoded unit in the adjacent encoded units as a second motion vector predictor of the $m^{th}$ control point, where j is any one of 1, ..., or J, J is a quantity of the adjacent encoded units, and J is a positive integer;

generating L second motion vector groups based on second motion vector predictors of the M control points; and adding the K first motion vector groups to the end of the L second motion vector groups, to generate the Q motion vector groups.

Optionally, the adding the Q motion vector groups to the end of the N motion vector groups, to generate a candidate motion vector queue may include:

determining an eigenvalue corresponding to a $q^{th}$ motion vector group, where q comprises any positive integer not greater than Q;

sorting the Q motion vector groups in ascending order based on eigenvalues corresponding to the Q motion vector groups; and adding the sorted Q motion vector groups to the end of the sorted N motion vector groups, to generate the candidate motion vector queue.

Optionally, the determining an eigenvalue corresponding to a $q^{th}$ motion vector group includes:

determining a difference between components, in one prediction direction, of motion vector predictors, in the $q^{th}$ motion vector group, of adjacent control points in the M control points;

comparing an absolute value of the difference with a preset comp neat threshold, where the preset component threshold is a range of the to-be-encoded unit in the prediction direction; and if the absolute value of the difference is less than or equal to the preset component threshold, determining the eigenvalue corresponding to the $q^{th}$ motion vector group.

Optionally, the determining an eigenvalue corresponding to a $q^{th}$ motion vector group may include:

determining, from the adjacent encoded units, an encoded unit corresponding to another control point, where a distance between the encoded unit corresponding to the another control point and the another control point is less than or equal to the preset distance, and the another control point is any control point other than the M control points in the to-be-encoded unit;

determining a motion vector of the encoded unit corresponding to the another control point as a motion vector predictor of the another control point; and determining the eigenvalue corresponding to the $q^{th}$ motion vector group by using a third preset algorithm and based on the motion vector predictor of the another control point and motion vector predictors, in the $q^{th}$ motion vector group, of the M control points.

Optionally, the motion prediction mode of the to-be-encoded unit includes a translation motion prediction mode or an affine motion prediction mode.

An embodiment of the present invention further provides an image decoding method, including:

determining N decoded units from adjacent decoded units of a to-be-decoded unit according to a first preset rule, where a motion prediction mode of the N decoded units is the same as that of the to-be-decoded unit, and N is a positive integer;

generating an $n^{th}$ motion vector group by using a first preset algorithm and based on a motion vector of an $n^{th}$ decoded unit, where n comprises any positive integer not greater than N;

decoding a bitstream corresponding to the to-be-decoded unit, to obtain a prediction residual of each sample unit and an index identifier of an optimal motion vector group;

determining the optimal motion vector group in N motion vector groups based on the index identifier of the optimal motion vector group;

determining a prediction sample value of each sample unit in the to-be-decoded unit by using a second preset algorithm and based on the optimal motion vector group; and determining a reconstruction sample value of each sample unit based on a sum of the prediction sample value of each sample unit and the prediction residual of each sample unit.

Optionally, the generating an $n^{th}$ motion vector group by using a first preset algorithm and based on a motion vector of an $n^{th}$ decoded unit may include:

determining motion vector predictors of M control points of the to-be-decoded unit by using the first preset algorithm and based on the motion vector of the $n^{th}$ decoded unit, sample coordinates of the $n^{th}$ decoded unit, and sample coordinates of the M control points; and generating the $n^{th}$ motion vector group based on the motion vector predictors of the M control points, where M is a positive integer determined based on the motion prediction mode of the to-be-decoded unit.

Optionally, the M control points include an upper-left vertex and an upper-right vertex of the to-be-decoded unit; and the determining motion vector predictors of M control points of the to-be-decoded unit by using the first preset algorithm and based on the motion vector of the $n^{th}$ decoded unit, sample coordinates of the $n^{th}$ decoded unit, and sample coordinates of the M control points includes:

determining a motion vector predictor $(v_{x0}, v_{y0})$ of the upper-left vertex of the to-be-decoded unit by using the following formula (1) and based on a motion vector $(v_{x2}, v_{y2})$ of an upper-left vertex of the $n^{th}$ decoded unit, a motion vector $(v_{x3}, v_{y3})$ of an upper-right vertex of the $n^{th}$ decoded unit, a motion vector $(v_{x4}, v_{y4})$ of a lower-left vertex of the $n^{th}$ decoded unit, sample coordinates $(x_2, y_2)$ of the upper-left vertex of the $n^{th}$ decoded unit, sample coordinates $(x_3, y_3)$ of the upper-right vertex of the $n^{th}$ decoded unit, sample coordinates $(x_4, y_4)$ of the lower-left vertex of the $n^{th}$ decoded unit, and sample coordinates $x_0, y_0)$ of the upper-left vertex of the to-be-decoded unit:

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \quad \text{formula (1)}$$

and determining a motion vector predictor $(v_{x1}, v_{y1})$ of the upper-right vertex of the to-be-decoded unit by using the following formula (2) and based on the motion vector $(v_{x2}, v_{y2})$ of the upper-left vertex of the $n^{th}$ decoded unit, the motion vector $(v_{x3}, v_{y3})$ of the upper-right vertex of the $n^{th}$ decoded unit, the sample coordinates $(x_2, y_2)$ of the upper-left vertex of the $n^{th}$ decoded unit, the sample coordinates $(x_3, y_3)$ of the upper-right vertex of the $n^{th}$ decoded unit, the motion vector predictor $(v_{x0}, v_{y0})$ of the upper-left vertex of the to-be-decoded unit, the sample coordinates $(x_0, y_0)$ of the upper-left vertex of the to-be-decoded unit, and sample coordinates $(x_1, y_1)$ of upper-left vertex of the to-be-decoded unit:

$$\begin{cases} v_{x1} = v_{x0} + \dfrac{(x_1 - x_0) \times (v_{x3} - v_{x2})}{(x_3 - x_2)} \\ v_{y1} = v_{y0} + \dfrac{(x_1 - x_0) \times (v_{y3} - v_{y2})}{(x_3 - x_2)} \end{cases} \quad \text{formula (2)}$$

Optionally, the determining the optimal motion vector group in N motion vector groups based on the index identifier of the optimal motion vector group may include:

sorting the N motion vector groups according to a preset sorting rule, to generate a candidate motion vector queue;

if N is greater than or equal to a preset value, determining a preset quantity of motion vector groups in the front of the candidate motion vector queue; and determining the optimal motion vector group in the preset quantity of motion vector groups in the front based on the index identifier of the optimal motion vector group.

Optionally, the preset sorting rule includes a descending order of the N decoded units.

Optionally, the determining the optimal motion vector group in N motion vector groups based on the index identifier of the optimal motion vector group may include:

sorting the N motion vector groups according to a preset sorting rule;

if N is less than a preset value, generating Q motion vector groups, where a sum of N and Q is greater than or equal to the preset value, and Q is a positive integer;

adding the Q motion vector groups to the end of the N motion vector groups, to generate a candidate motion vector queue;

determining a preset quantity of motion vector groups in the front of the candidate motion vector queue; and determining the optimal motion vector group in the preset quantity of motion vector groups in the front based on the index identifier of the optimal motion vector group.

Optionally, the generating Q motion vector groups includes:
- determining, from the adjacent decoded units, a decoded unit corresponding to an $m^{th}$ control point in the to-be-decoded unit, where a distance between the decoded unit corresponding to the $m^{th}$ control point and the $m^{th}$ control point is less than or equal to a preset distance, and in comprises any positive integer not greater than M;
- determining a motion vector of the decoded unit corresponding to the $m^{th}$ control point as a motion vector predictor of the $m^{th}$ control point; and
- generating the Q motion vector groups based on the motion vector predictors of the M control points.

Alternatively, the generating Q motion vector groups includes:
- determining, from the adjacent decoded units, a decoded unit corresponding to an $m^{th}$ control point in the to-be-decoded unit, where a distance between the decoded unit corresponding to the $m^{th}$ control point and the $m^{th}$ control point is less than or equal to a preset distance, and in comprises any positive integer not greater than M;
- determining a motion vector of the decoded unit corresponding to the $m^{th}$ control point as a first motion vector predictor of the $m^{th}$ control point;
- generating K first motion vector groups based on first motion vector predictors of the M control points;
- determining a motion vector of a $j^{th}$ decoded unit in the adjacent decoded units as a second motion vector predictor of the $m^{th}$ control point, where j is any one of 1, . . . , or J, J is a quantity of the adjacent decoded units, and J is a positive integer;
- generating L second motion vector groups based on second motion vector predictors of the M control points; and
- adding the K first motion vector groups to the end of the L second motion vector groups, to generate the Q motion vector groups.

Optionally, the adding the Q motion vector groups to the end of the N motion vector groups, to generate a candidate motion vector queue includes:
- determining an eigenvalue corresponding to a $q^{th}$ motion vector group, where q comprises any positive integer not greater than Q;
- sorting the Q motion vector groups in ascending order based on eigenvalues corresponding to the Q motion vector groups and
- adding the sorted Q motion vector groups to the end of the sorted N motion vector groups, to generate the candidate motion vector queue.

Optionally, the determining an eigenvalue corresponding to a $q^{th}$ motion vector group includes:
- determining a difference between components, in one prediction direction, of motion vector predictors, in the $q^{th}$ motion vector group, of adjacent control points in the M control points;
- comparing an absolute value of the difference with a preset component threshold, where the preset component threshold is a range of the to-be-decoded unit in the prediction direction; and
- if the absolute value of the difference is less than or equal to the preset component threshold, determining the eigenvalue corresponding to the $q^{th}$ motion vector group.

Optionally, the determining an eigenvalue corresponding to a $q^{th}$ motion vector group includes:
- determining, from the adjacent decoded units, a decoded unit corresponding to another control point, where a distance between the decoded unit corresponding to the another control point and the another control point is less than or equal to the preset distance, and the another control point is any control point other than the M control points in the to-be-decoded unit;
- determining a motion vector of the decoded unit corresponding to the another control point as a motion vector predictor of the another control point; and
- determining the eigenvalue corresponding to the $q^{th}$ motion vector group by using a third preset algorithm and based on the motion vector predictor of the another control point and motion vector predictors, in the $q^{th}$ motion vector group, of the M control points.

Optionally, the motion prediction mode of the to-be-decoded unit includes a translation motion prediction mode or an affine motion prediction mode.

An embodiment of the present invention further provides an image encoding apparatus, including:
- a determining module, configured to determine N encoded units from adjacent encoded units of a to-be-encoded unit according to a first preset rule, where a motion prediction mode of the N encoded units is the same as that of the to-be-encoded unit, and N is a positive integer;
- a calculation module, configured to generate an $n^{th}$ motion vector group by using a first preset algorithm and based on a motion vector of an $n^{th}$ encoded unit determined by the determining module, where a comprises any positive integer not greater than N, where
- the determining module is further configured to determine, from N motion vector groups obtained by the calculation module and according to a second preset rule, one motion vector group as an optimal motion vector group; and
- the calculation module is further configured to: determine a prediction sample value of each sample unit in the to-be-encoded unit by using a second preset algorithm and based on the optimal motion vector group determined by the determining module, and determine a prediction residual of each sample unit based on a difference between an original sample value of each sample unit and the prediction sample value of each sample unit; and
- an encoding module, configured to encode the prediction residual of each sample unit and an index identifier of the optimal motion vector group, to obtain a bitstream corresponding to the to-be-encoded unit, where the index identifier of the optimal motion vector group is used to instruct a decoding apparatus to determine the prediction sample value of each sample unit.

Optionally, the calculation module is specifically configured to: determine motion vector predictors of M control points of the to-be-encoded unit by using the first preset algorithm and based on the motion vector of the $n^{th}$ encoded unit determined by the determining module, sample coordinates of the $n^{th}$ encoded unit, and sample coordinates of the M control points; and generate the $n^{th}$ motion vector group based on the motion vector predictors of the M control points, where M is a positive integer determined based on the motion prediction mode of the to-be-encoded unit.

Optionally, the M control points include an upper-left vertex and an upper-right vertex of the to-be-encoded unit; the calculation module is specifically configured to determine a motion vector predictor $(v_{x0}, v_{y0})$ of the upper-left vertex of the to-be-encoded unit by using the following formula (1) and based on a motion vector ($v_{x2}$, $v_{y2}$) of an upper-left vertex of the $n^{th}$ encoded unit determined by the determining module, a motion vector ($v_{x3}$, $v_{y3}$) of an upper-right vertex of the $n^{th}$ encoded unit, a motion vector ($v_{x4}$, $v_{y4}$) of a lower-left vertex of the $n^{th}$ encoded unit, sample coordinates ($x_2$, $y_2$) of the upper-left vertex of the $n^{th}$ encoded unit, sample coordinates ($x_3$, $y_3$) of the upper-right vertex of the $n^{th}$ encoded unit, sample coordinates ($x_4$, $y_4$) of the lower-left vertex of the $n^{th}$ encoded unit, and sample coordinates ($x_0$, $y_0$) of the upper-left vertex of the to-be-encoded unit:

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \quad \text{formula (1)};$$

and the calculation module is further configured to determine a motion vector predictor ($v_{x1}$, $v_{y1}$) of the upper-right vertex of the to-be-encoded unit by using the following formula (2) and based on the motion vector ($v_{x2}$, $v_{y2}$) of the upper-left vertex of the $n^{th}$ encoded unit determined by the determining module, the motion vector ($v_{x3}$, $v_{y3}$) of the upper-right vertex of the $n^{th}$ encoded unit, the sample coordinates ($x_2$, $y_2$) of the upper-left vertex of the $n^{th}$ encoded unit, the sample coordinates ($x_3$, $y_3$) of the upper-right vertex of the $n^{th}$ encoded unit, the motion vector predictor ($v_{x0}$, $v_{y0}$) of the upper-left vertex of the to-be-encoded unit, the sample coordinates ($x_0$, $y_0$) of the upper-left vertex of the to-be-encoded unit, and sample coordinates ($x_1$, $y_1$) of the upper-left vertex of the to-be-encoded unit:

$$\begin{cases} v_{x1} = v_{x0} + \dfrac{(x_1 - x_0) \times (v_{x3} - v_{x2})}{(x_3 - x_2)} \\ v_{y1} = v_{y0} + \dfrac{(x_1 - x_0) \times (v_{y3} - v_{y2})}{(x_3 - x_2)} \end{cases} \quad \text{formula (2)}.$$

Optionally, the determining module is specifically configured to: sort the N motion vector groups according to a preset sorting rule, to generate a candidate motion vector queue; if N is greater than or equal to a preset value, determine a preset quantity of motion vector groups in the front of the candidate motion vector queue; determine a matching error between each of the preset quantity of motion vector groups in the front and the to-be-encoded unit; and determine one motion vector group with a smallest matching error as the optimal motion vector group.

Optionally, the preset sorting rule includes a descending order of the N encoded units.

Optionally, the determining module is further configured to: sort the N motion vector groups according to a preset sorting rule; if N is less than a preset value, generate Q motion vector groups, where a sum of N and Q is greater than or equal to the preset value, and Q is a positive integer; add the Q motion vector groups to the end of the N motion vector groups, to generate a candidate motion vector queue; determine a preset quantity of motion vector groups in the front of the candidate motion vector queue; determine a matching error between each of the preset quantity of motion vector groups in the front and the to-be-encoded unit; and determine one motion vector group with a smallest matching error as the optimal motion vector group.

Optionally, the determining module is further configured to: determine, from the adjacent encoded units, an encoded unit corresponding to an $m^{th}$ control point in the to-be-encoded unit, where a distance between the encoded unit corresponding to the $m^{th}$ control point and the $m^{th}$ control point is less than or equal to a preset distance, and m comprises any positive integer not greater than M; determine a motion vector of the encoded unit corresponding to the $m^{th}$ control point as a motion vector predictor of the $m^{th}$ control point; and generate the Q motion vector groups based on the motion vector predictors of the M control points.

Optionally, the determining module is further configured to: determine, from the adjacent encoded units, an encoded unit corresponding to an $m^{th}$ control point in the to-be-encoded unit, where a distance between the encoded unit corresponding to the $m^{th}$ control point and the $m^{th}$ control point is less than or equal to a preset distance, and m comprises any positive integer not greater than M; determine a motion vector of the encoded unit corresponding to the $m^{th}$ control point as a first motion vector predictor of the $m^{th}$ control point; generate K first motion vector groups based on first motion vector predictors of the M control points; determine a motion vector of a $j^{th}$ encoded unit in the adjacent encoded units as a second motion vector predictor of the $m^{th}$ control point, where j is any one of 1, . . . , or J, J is a quantity of the adjacent encoded units, and J is a positive integer; generate L second motion vector groups based on second motion vector predictors of the M control points; and add the K first motion vector groups to the end of the L second motion vector groups, to generate the Q motion vector groups.

Optionally, the determining module is further configured to: determine an eigenvalue corresponding to a $q^{th}$ motion vector group, where q comprises any positive integer not greater than Q; sort the Q motion vector groups in ascending order based on eigenvalues corresponding to the Q motion vector groups; and add the sorted Q motion vector groups to the end of the sorted N motion vector groups, to generate the candidate motion vector queue.

Optionally; the determining module is further configured to: determine a difference between components, in one prediction direction, of motion vector predictors, in the $q^{th}$ motion vector group, of adjacent control points in the M control points; compare an absolute value of the difference with a preset component threshold, where the preset component threshold is a range of the to-be-encoded unit in the prediction direction; and if the absolute value of the difference is less than or equal to the preset component threshold, determine the eigenvalue corresponding to the $q^{th}$ motion vector group.

Optionally, the determining module is further configured to: determine, from the adjacent encoded units, an encoded unit corresponding to another control point, where a distance between the encoded unit corresponding to the another control point and the another control point is less than or equal to the preset distance, and the another control point is any control point other than the M control points in the to-be-encoded unit; determine a motion vector of the encoded unit corresponding to the another control point as a motion vector predictor of the another control point; and determine the eigenvalue corresponding to the $q^{th}$ motion vector group by using a third preset algorithm and based on the motion vector predictor of the another control point and motion vector predictors, in the $q^{th}$ motion vector group, of the M control points.

Optionally; the motion prediction mode of the to-be-encoded unit includes a translation motion prediction mode or an affine motion prediction mode.

An embodiment of the present invention further provides an image decoding apparatus, including:

a determining module, configured to determine N decoded units from adjacent decoded units of a to-be-decoded unit according to a first preset rule, where a motion prediction mode of the N decoded units is the same as that of the to-be-decoded unit, and N is a positive integer;

a calculation module, configured to generate an $n^{th}$ motion vector group by using a first preset algorithm and based on a motion vector of an $n^{th}$ decoded unit determined by the determining module, where n comprises any positive integer not greater than N; and a decoding module, configured to decode a bitstream corresponding to the to-be-decoded unit, to obtain a prediction residual of each sample unit and an index identifier of an optimal motion vector group, where the determining module is further configured to determine the optimal motion vector group in N motion vector groups based on the index identifier of the optimal motion vector group that is determined by the decoding module; and the calculation module is further configured to: determine a prediction sample value of each sample unit in the to-be-decoded unit by using a second preset algorithm and based on the optimal motion vector group determined by the determining module, and determine a reconstruction sample value of each sample unit based on a sum of the prediction sample value of each sample unit and the prediction residual of each sample unit.

Optionally, the calculation module is specifically configured to: determine motion vector predictors of M control points of the to-be-decoded unit by using the first preset algorithm and based on the motion vector of the $n^{th}$ decoded unit determined by the determining module, sample coordinates of the $n^{th}$ decoded unit, and sample coordinates of the M control points; and generate the $n^{th}$ motion vector group based on the motion vector predictors of the M control points, where M is a positive integer determined based on the motion prediction mode of the to-be-decoded unit.

Optionally, the M control points include an upper-left vertex and an upper-right vertex of the to-be-decoded unit;

the calculation module is specifically configured to determine a motion vector predictor $(v_{x0}, v_{y0})$ of the upper-left vertex of the to-be-decoded unit by using the following formula (1) and based on a motion vector $(v_{x2}, v_{y2})$ of an upper-left vertex of the $n^{th}$ decoded unit determined by the determining module, a motion vector $(v_{x3}, v_{y3})$ of an upper-right vertex of the $n^{th}$ decoded unit, a motion vector $(v_{x4}, v_{y4})$ of a lower-left vertex of the $n^{th}$ decoded unit, sample coordinates $(x_2, y_2)$ of the upper-left vertex of the $n^{th}$ decoded unit, sample coordinates $(x_3, y_3)$ of the upper-right vertex of the $n^{th}$ decoded unit, sample coordinates $(x_4, y_4)$ of the lower-left vertex of the $n^{th}$ decoded unit, and sample coordinates $(x_0, y_0)$ of the upper-left vertex of the to-be-decoded unit:

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \quad \text{formula (1)}$$

and specifically, the calculation module is further configured to determine a motion vector predictor $(v_{x1}, v_{y1})$ of the upper-right vertex of the to-be-decoded unit by using the following formula (2) and based on the motion vector $(v_{x2}, v_{y2})$ of the upper-left vertex of the $n^{th}$ decoded unit determined by the determining module, the motion vector $(v_{x3}, v_{y3})$ of the upper-right vertex of the $n^{th}$ decoded unit, the sample coordinates $(x_2, y_2)$ of the upper-left vertex of the $n^{th}$ decoded unit, the sample coordinates $(x_3, y_3)$ of the upper-right vertex of the $n^{th}$ decoded unit, the motion vector predictor $(v_{x0}, v_{y0})$ of the upper-left vertex of the to-be-decoded unit, the sample coordinates $(x_0, y_0)$ of the upper-left vertex of the to-be-decoded unit, and sample coordinates $(x_1, y_1)$ of the upper-left vertex of the to-be-decoded unit:

$$\begin{cases} v_{x1} = v_{x0} + \dfrac{(x_1 - x_0) \times (v_{x3} - v_{x2})}{(x_3 - x_2)} \\ v_{y1} = v_{y0} + \dfrac{(x_1 - x_0) \times (v_{y3} - v_{y2})}{(x_3 - x_2)} \end{cases} \quad \text{formula (2)}$$

Optionally, the determining module is further configured to: sort the N motion vector groups according to a preset sorting rule, to generate a candidate motion vector queue; if N is greater than or equal to a preset value, determine a preset quantity of motion vector groups in the front of the candidate motion vector queue; and determine the optimal motion vector group in the preset quantity of motion vector groups in the front based on the index identifier of the optimal motion vector group.

Optionally, the preset sorting rule includes a descending order of the N decoded units.

Optionally, the determining module is further configured to: sort the N motion vector groups according to a preset sorting rule; if N is less than a preset value, generate Q motion vector groups, where a sum of N and Q is greater than or equal to the preset value, and Q is a positive integer; add the Q motion vector groups to the end of the N motion vector groups, to generate a candidate motion vector queue; determine a preset quantity of motion vector groups in the front of the candidate motion vector queue; and determine the optimal motion vector group in the preset quantity of motion vector groups in the front based on the index identifier of the optimal motion vector group.

Optionally, the determining module is further configured to: determine, from the adjacent decoded units, a decoded unit corresponding to an $m^{th}$ control point in the to-be-decoded unit, where a distance between the decoded unit corresponding to the $m^{th}$ control point and the $m^{th}$ control point is less than or equal to a preset distance, and m comprises any positive integer not greater than M; determine a motion vector of the decoded unit corresponding to the $m^{th}$ control point as a motion vector predictor of the $m^{th}$ control point and generate the Q motion vector groups based on the motion vector predictors of the M control points.

Optionally, the determining module is further configured to: determine, from the adjacent decoded units, a decoded unit corresponding to an $m^{th}$ control point in the to-be-decoded unit, where a distance between the decoded unit corresponding to the $m^{th}$ control point and the $m^{th}$ control point is less than or equal to a preset distance, and m comprises any positive integer not greater than M; determine a motion vector of the decoded unit corresponding to the $m^{th}$ control point as a first motion vector predictor of the $m^{th}$ control point; generate K first motion vector groups based on first motion vector predictors of the M control points; determine a motion vector of a $j^{th}$ decoded unit in the adjacent decoded units as a second motion vector predictor of the $m^{th}$ control point, where j is any one of 1, ..., or J, J is a quantity of the adjacent decoded units, and J is a positive integer; generate L second motion vector groups based on second motion vector predictors of the M control points; and add the K first motion vector groups to the end of the L second motion vector groups, to generate the Q motion vector groups.

Optionally, the determining module is further configured to: determine an eigen value corresponding to a $q^{th}$ motion vector group, where q comprises any positive integer not greater than Q; sort the Q motion vector groups in ascending order based on eigenvalues corresponding to the Q motion vector groups; and add the sorted Q motion vector groups to the end of the sorted N motion vector groups, to generate the candidate motion vector queue.

Optionally, the determining module is further configured to: determine a difference between components, in one prediction direction, of motion vector predictors, in the $q^{th}$ motion vector group, of adjacent control points in the M control points; compare an absolute value of the difference with a preset component threshold, where the preset component threshold is a range of the to-be-decoded unit in the prediction direction; and if the absolute value of the difference is less than or equal to the preset component threshold, determine the eigenvalue corresponding to the $q^{th}$ motion vector group.

Optionally, the determining module is further configured to: determine, from the adjacent decoded units, a decoded unit corresponding to another control point, where a distance between the decoded unit corresponding to the another control point and the another control point is less than or equal to the preset distance, and the another control point is any control point other than the M control points in the to-be-decoded unit; determine a motion vector of the decoded unit corresponding to the another control point as a motion vector predictor of the another control point; and determine the eigenvalue corresponding to the $q^{th}$ motion vector group by using a third preset algorithm and based on the motion vector predictor of the another control point and motion vector predictors, in the $q^{th}$ motion vector group, of the M control points.

Optionally, the motion prediction mode of the to-be-decoded unit includes a translation motion prediction mode or an affine motion prediction mode.

An embodiment of the present invention further provides an image encoding apparatus, including a processor, a memory, a communications interface, and a bus, where the processor is connected to the memory and the communications interface by using the bus;

the memory is configured to store an instruction; and the processor is configured to execute the instruction, and when the processor executes the instruction stored in the memory, the processor performs any one of the foregoing image encoding methods.

An embodiment of the present invention further provides an image decoding apparatus, including a processor, a memory, a communications interface, and a bus, where the processor is connected to the memory and the communications interface by using the bus;

the memory is configured to store an instruction; and the processor is configured to execute the instruction, and when the processor executes the instruction stored in the memory, the processor performs any one of the foregoing image decoding methods.

According to the image encoding method and apparatus and the image decoding method and apparatus in the embodiments of the present invention, the N encoded units may be determined from the adjacent encoded units of the to-be-encoded unit according to the first preset rule, where the motion prediction mode of the N encoded units is the same as that of the to-be-encoded unit, and N is a positive integer; the $n^{th}$ motion vector group is generated by using the first preset algorithm and based on the motion vector of the $n^{th}$ encoded unit, where n comprises any positive integer not greater than N; one motion vector group is determined, as the optimal motion vector group, from the obtained N motion vector groups according to the second preset rule; the prediction sample value of each sample unit in the to-be-encoded unit is determined by using the second preset algorithm and based on the optimal motion vector group; the prediction residual of each sample unit is determined based on the difference between the original sample value of each sample unit and the prediction sample value of each sample unit; and the prediction residual of each sample unit and the index identifier of the optimal motion vector group are encoded to obtain the bitstream corresponding to the to-be-encoded unit, where the index identifier of the optimal motion vector group is used to instruct the decoding apparatus to determine the prediction sample value of each sample unit. Because the motion prediction mode of the N encoded units is the same as that of the to-be-encoded unit, a motion correlation between the N encoded units and the to-be-encoded unit is relatively high. In addition, the optimal motion vector group is determined from the N motion vector groups that are determined based on motion vectors of the N encoded units. Therefore, the prediction sample value, determined based on the optimal motion vector group, of each sample unit in the to-be-encoded unit is more accurate, and encoding accuracy is higher.

BRIEF DESCRIPTION OF DRAWINGS

To describe technical solutions in embodiments of the present invention more clearly, the following, briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1 is a flowchart of an image encoding method according to Embodiment 1 of the present invention;

DESCRIPTION OF EMBODIMENTS

Figure 2:
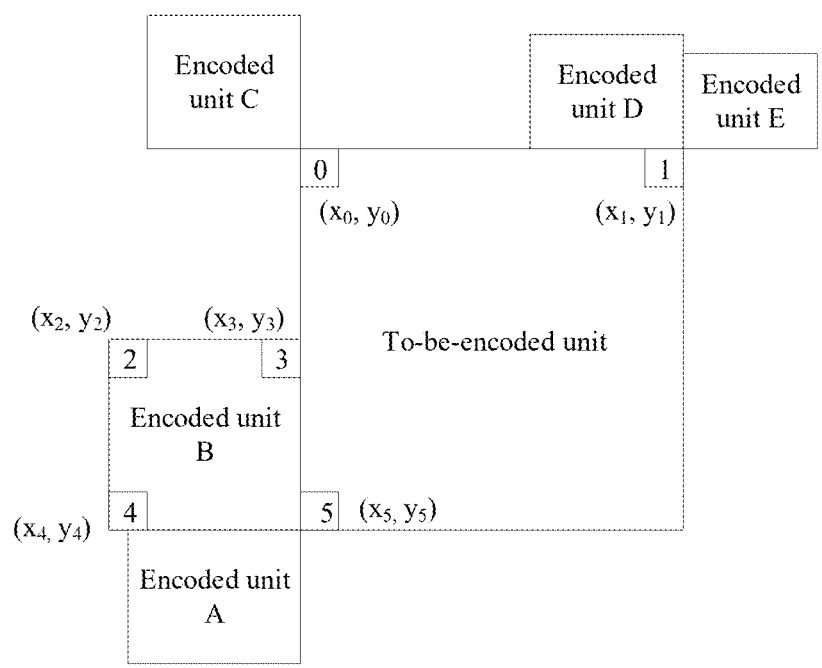
FIG. 2 is a schematic structural diagram of a to-be-encoded unit and adjacent encoded units in the image encoding method according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

An image encoding method and apparatus and an image decoding method and apparatus provided in the present invention may be applied to scenarios such as satellite and terrestrial television broadcasting systems, video conferencing, security surveillance, medical demonstration, classroom recording and broadcasting, and court hearing systems. Motion prediction is performed on a to-be-processed unit of a video image by using an inter-frame prediction mode, and the video image is encoded or decoded based on a result of the motion prediction. According to the image encoding method and apparatus, a prediction sample value of each sample unit in a to-be-encoded unit in the video image may be obtained by motion prediction, and a difference between the prediction sample value of each sample unit and an original sample value of each sample unit is encoded to obtain a bitstream corresponding to the to-be-encoded unit, so that storage or transmission of an image corresponding to the to-be-encoded unit is implemented through storage or transmission of the bitstream corresponding to the to-be-encoded unit. Correspondingly, according to the image decoding method and apparatus, a prediction sample value of each sample unit in a to-be-decoded unit in the video image may be obtained by motion prediction, a bitstream corresponding to the to-be-decoded unit is decoded to obtain a difference between a prediction sample value of each sample unit of the to-be-decoded unit and an original sample value of each sample unit, and further, a reconstruction sample value of each sample unit is obtained based on the difference and the prediction sample value, so that an image corresponding to the to-be-decoded unit may be obtained based on the reconstruction sample value of each sample unit. For example, the bitstream corresponding to the to-be-decoded unit may be transmitted by an image encoding apparatus and received by the image decoding apparatus, or may be obtained by the image decoding apparatus from a storage device, where the bitstream in the storage device may be stored in the storage device by the image decoding apparatus.

Embodiment 1 of the present invention provides an image encoding method. The image encoding method may be performed by an image encoding apparatus. For example, the image encoding apparatus may be integrated, in a form of software and/or hardware, in an electronic device with an image processing function. For example, the electronic device may be an intelligent terminal, a personal computer, a consumer electronic product, or a video server. FIG. 1 is a flowchart of an image encoding method according to Embodiment 1 of the present invention. As shown in FIG. 1, the method may include the following steps.

S101: Determine N encoded units from adjacent encoded units of a to-be-encoded unit according to a first preset rule, where a motion prediction mode of the N encoded units is the same as that of the to-be-encoded unit.

Specifically, the to-be-encoded unit may be a coding unit (CU) in a High Efficiency Video Coding (HEVC) standard and a subsequent coding standard. In the HEVC standard, a maximum coding unit may be a coding tree unit (CTU), and each CTU may be divided per level to obtain smaller CUs. A size of the CU may include four levels, such as four levels of 64×64, 32×32, 16×16, and 8×8. A CU at the 64×64 level includes 64×64 samples, a CU at the 32×32 level includes 32×32 samples, a CU at the 16×16 level includes 16×16 samples, and a CU at the 8×8 level includes 8×8 samples. The to-be-encoded unit may be a coding unit corresponding to any one of the four levels of 64×64, 32×32, 16×16, and 8×8.

Different coding units in a frame of image of a video image are independent from each other. The different coding units may be the same or may be different. To be specific, in each frame of image, the image encoding apparatus may perform encoding per each coding unit, and motion prediction modes used for encoding the different coding units may be the same or may be different. The image encoding apparatus may perform motion prediction on each sample unit in a coding unit by using a motion prediction mode of the coding unit, to determine a prediction sample value of each sample unit and further implement encoding. The motion prediction mode may be used to determine a motion vector of a control point in the coding unit, and further determine the prediction sample value of each sample unit in the coding unit. For example, the sample unit may include a sample or a sample block, where the sample block may include a plurality of samples.

The adjacent encoded units of the to-be-encoded unit may be encoded units in locations adjacent to boundaries of the to-be-encoded unit.

The determining N encoded units from adjacent encoded units of a to-be-encoded unit according to a first preset rule in S101 may include: traversing the adjacent encoded units of the to-be-encoded unit in a preset traversal sequence, to determine the N encoded units, in the adjacent encoded units, whose motion prediction mode is the same as that of the to-be-encoded unit. The traversing the adjacent encoded units may be: determining whether a motion prediction mode of the adjacent encoded units is the same as that of the to-be-encoded unit. A motion prediction mode of an encoded unit is certain, and therefore the motion prediction mode of the adjacent encoded units may be a motion prediction mode used when encoding is performed on the adjacent encoded units. The motion prediction mode of the to-be-encoded unit is a motion prediction mode that can be used for prediction.

After the determining N encoded units from adjacent encoded units of a to-be-encoded unit according to a first preset rule in S101, the method may further include:

determining indication information corresponding to the motion prediction mode.

If the motion prediction mode includes an affine motion prediction mode, indication information corresponding to the affine motion prediction mode may be determined, for example, a syntactic element affine-merge-flag, and the affine-merge-flag is set to 1.

If the motion prediction mode includes the affine motion prediction mode but none of the adjacent encoded units has a same motion prediction mode as that of the to-be-encoded unit, the affine-merge-flag may be set to 0.

For example, if the motion prediction mode of the to-be-encoded unit may be the affine motion prediction mode, the image encoding apparatus may traverse the adjacent encoded units of the to-be-encoded unit in the preset traversal sequence, and determine N encoded units, in the adjacent encoded units, whose motion prediction mode is the affine motion prediction mode. The affine motion prediction mode may also be referred to as an affine transformation motion prediction mode. The preset traversal sequence may be a traversal sequence of all adjacent encoded units of the to-be-encoded unit. For example, each of the N encoded units may be a 4×4 unit.

FIG. 2 is a schematic structural diagram of a to-be-encoded unit and adjacent encoded units in the image encoding method according to Embodiment 1 of the present invention. As shown in FIG. 2, for example, the adjacent encoded units of the to-be-encoded unit may include an encoded unit A, an encoded unit B, an encoded unit C, an encoded unit D, and an encoded unit E. If the motion prediction mode of the to-be-encoded unit is the affine motion prediction mode, there may be a plurality of control points, for example, two control points, in the to-be-encoded unit. For example, the two control points may be an upper-left vertex of the to-be-encoded unit and an upper-right vertex of the to-be-encoded unit. The upper-left vertex of the to-be-encoded unit may be represented as a sample unit 0, and the upper-right vertex of the to-be-encoded unit may be represented as a sample unit 1.

The image encoding apparatus may sequentially traverse the encoded unit A and the encoded unit B in a first prediction direction, and find a first encoded unit in the first prediction direction whose motion prediction mode is the affine motion prediction mode, for example, the encoded unit B; and sequentially traverse the encoded unit C, the encoded unit D, and the encoded unit F in a second prediction direction, and find a first encoded unit whose motion prediction mode is the affine motion prediction mode, for example, the encoded unit D.

Alternatively, the image encoding apparatus may sequentially traverse the encoded unit A, the encoded unit B, the encoded unit C, the encoded unit D. and the encoded unit F, and find a first encoded unit whose motion prediction mode is the affine motion prediction mode, for example, the encoded un it B.

S102: Generate an $n^{th}$ motion vector group by using a first preset algorithm and based on a motion vector of an $n^{th}$ encoded unit, where n comprises any positive integer not greater than N.

Optionally, the generating an $n^{th}$ motion vector group by using a first preset algorithm and based on a motion vector of an $n^{th}$ encoded unit in S102 may include:

determining motion vector predictors of M control points of the to-be-encoded unit by using the first preset algorithm and based on the motion vector of the $n^{th}$ encoded unit, sample coordinates of the $n^{th}$ encoded unit, and sample coordinates of the M control points, where M is a positive integer determined based on the motion prediction mode of the to-be-encoded unit; and generating the $n^{th}$ motion vector group based on the motion vector predictors of the M control points.

Specifically, the M control points may include a sample unit in a vertex location of the to-be-encoded unit. If the motion prediction mode of the to-be-encoded unit is the affine motion prediction mode, M may be greater than 1, and the M control points may include M vertexes of the to-be-encoded unit.

For example, if the motion prediction mode of the to-be-encoded unit is the affine motion prediction mode, M may be 2, and the M control points may include the upper-left vertex of the to-be-encoded unit and the upper-right vertex of the to-be-encoded unit. The upper-left vertex of the to-be-encoded unit may be a sample unit 0 in FIG. 2, and the upper-right vertex of the to-be-encoded unit may be a sample unit 1 in FIG. 2. For example, the $n^{th}$ encoded unit in the N encoded units that is determined in S101 may be the encoded unit B in FIG. 2. The following provides descriptions by using the encoded unit B as an example. At least two sample units in the encoded unit B in FIG. 2 may be three sample units: an upper-left vertex of the encoded unit B, an upper-right vertex of the encoded unit B, and a lower-left vertex of the encoded unit B. The upper-left vertex of the encoded unit B may be a sample unit 2, the upper-right vertex of the encoded unit B may be represented as a sample unit 3, and the lower-left vertex of the encoded unit B may be represented as a sample unit 4.

The determining motion vector predictors of M control points of the to-be-encoded unit by using the first preset algorithm and based on the motion vector of the $n^{th}$ encoded unit, sample coordinates of the $n^{th}$ encoded unit, and sample coordinates of the M control points may include:

determining a motion vector predictor $(v_{x0}, v_{y0})$ of the upper-left vertex of the to-be-encoded unit by using the following formula (1) and based on a motion vector $(v_{x2}, v_{y2})$ of an upper-left vertex of the $n^{th}$ encoded unit, a motion vector $(v_{x3}, v_{y3})$ of an upper-right vertex of the $n^{th}$ encoded unit, a motion vector $(v_{x4}, v_{y4})$ of a lower-left vertex of the $n^{th}$ encoded unit, sample coordinates $(x_2, y_2)$ of the upper-left vertex of the $n^{th}$ encoded unit, sample coordinates $(x_3, y_3)$ of the upper-right vertex of the $n^{th}$ encoded unit, sample coordinates $(x_4, y_4)$ of the lower-left vertex of the $n^{th}$ encoded unit, and sample coordinates $(x_0, y_0)$ of the upper-left vertex of the to-be-encoded unit:

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \quad \text{formula (1)}$$

and determining a motion vector predictor $(v_{x1}, v_{y1})$ of the upper-right vertex of the to-be-encoded unit by using the following formula (2) and based on the motion vector $(v_{x2}, v_{y2})$ of the upper-left vertex of the $n^{th}$ encoded unit, the motion vector $(v_{x3}, v_{y3})$ of the upper-right vertex of the $n^{th}$ encoded unit, the sample coordinates $(x_2, y_2)$ of the upper-left vertex of the $n^{th}$ encoded unit, the sample coordinates $(x_3, y_3)$ of the upper-right vertex of the $n^{th}$ encoded unit, the motion vector predictor $(v_{x0}, v_{y0})$ of the upper-left vertex of the to-be-encoded unit, the sample coordinates $(x_0, y_0)$ of the upper-left vertex of the to-be-encoded unit, and sample coordinates $(x_1, y_1)$ of the upper-left vertex of the to-be-encoded unit:

$$\begin{cases} v_{x1} = v_{x0} + \dfrac{(x_1 - x_0) \times (v_{x3} - v_{x2})}{(x_3 - x_2)} \\ v_{y1} = v_{y0} + \dfrac{(x_1 - x_0) \times (v_{y3} - v_{y2})}{(x_3 - x_2)} \end{cases} \quad \text{formula (2)}$$

S103: Determine, from obtained N motion vector groups according to a second preset rule, one motion vector group as an optimal motion vector group.

Optionally, the determining, from obtained N motion vector groups according to a second preset rule, one motion vector group as an optimal motion vector group in S103 may include:

sorting the N motion vector groups according to a preset sorting rule, to generate a candidate motion vector queue;

if N is greater than or equal to a preset value, determining a preset quantity of motion vector groups in the front of the candidate motion vector queue;

determining a matching error between each of the preset quantity of motion vector groups in the front and the to-be-encoded unit; and determining one motion vector group with a smallest matching error as the optimal motion vector group.

Specifically, the preset sorting rule may include a descending order of the N encoded units.

For example, a size of each of the N encoded units may be a product of a horizontal width and a vertical height of each encoded unit. For example, the size of each of the N encoded units may be determined based on the following formula (3):

$$S_i = W_i \times H_i \qquad \text{formula (3)}$$

where $S_i$ is the size of each encoded unit, $W_i$ is the horizontal width of each encoded unit, $H_i$ is the vertical height of each encoded unit, and i is an identifier of each encoded unit.

For example, if N is 2, the N encoded units may be the encoded unit B and the encoded unit D shown in FIG. 2.

A size of the encoded unit B may be $S_B$. $S_B$ is a product of $W_b$ and $H_B$. $W_B$ is a horizontal width of the encoded unit B. $H_B$ is a vertical height of the encoded unit B. A size of the encoded unit D may be $S_D$. $S_D$ is a product of $W_D$ and $H_D$. $W_D$ is a horizontal width of the encoded unit D. $H_D$ is a vertical height of the encoded unit D. For example, if the encoded unit B is larger than the encoded unit D, the traversal sequence may be represented as B>D.

For example, an index identifier corresponding to a motion vector group, in the candidate motion vector queue, generated based on the encoded unit B may be 1. For example, an index identifier corresponding to a motion vector group, in the candidate motion vector queue, generated based on the encoded unit D may be 2.

For example, if N is 10, in other words, the candidate motion vector queue includes 10 motion vector groups, the preset quantity of motion vector groups in the front of the candidate motion vector queue may be first five motion vector groups in the 10 motion vector groups.

Optionally, selecting the optimal motion vector group from the preset quantity of motion vector groups in the front of the candidate motion vector queue may be: determining a matching error between each of the preset quantity of motion vector groups in the front and the to-be-encoded unit; and determining one motion vector group that has a smallest matching error with the to-be-encoded unit as the optimal motion vector group.

The determining a matching error between each of the preset quantity of motion vector groups in the front and the to-be-encoded unit may be: determining, based on the motion vector group, a prediction sample value of a sample unit, in the to-be-encoded unit, corresponding to the motion vector group;

determining a rate distortion cost (RD Cost) corresponding to the motion vector group based on a sum of squared differences (SSD) or a sum of absolute differences (Sum of Absolute Differences, SAD for short) between the prediction sample value of the sample unit corresponding to the motion vector group and an original sample value of the sample unit; and determining the matching error between the motion vector group and the to-be-encoded unit based on the rate distortion cost corresponding to the motion vector group.

Specifically, the determining, based on the motion vector group, a prediction sample value of a sample unit, in the to-be-encoded unit, corresponding to the motion vector group in the foregoing step may include: determining a motion vector predictor of the sample unit based on the motion vector group, and further determining the rate distortion cost corresponding to the motion vector group based on the motion vector predictor of the sample unit.

For example, using the SAD as an example, the image encoding apparatus may determine the rate distortion cost corresponding to the motion vector group by using the following formula (4) and based on a hit rate corresponding to the to-be-encoded unit and an SAD between the prediction sample value of the sample unit corresponding to the motion vector group and the original sample value of the sample unit:

$$J = SAD + \lambda R \qquad \text{formula (4)}$$

where J is the rate distortion cost corresponding to the motion vector group, SAD is the SAD between the prediction sample value of the sample unit corresponding to the motion vector group and the original sample value of the sample unit, R is the bit rate corresponding to the to-be-encoded unit, and is a Lagrange multiplier and is a preset constant.

S104: Determine a prediction sample value of each sample unit in the to-be-encoded unit by using a second preset algorithm and based on the optimal motion vector group.

Optionally, the determining a prediction sample value of each sample unit in the to-be-encoded unit by using a second preset algorithm and based on the optimal motion vector group in S104 may include:

determining a motion vector predictor of each sample unit in the to-be-encoded unit by using the second preset algorithm and based on the motion vector predictors, in the optimal motion vector group, of the M control points and sample coordinates of each sample unit; and determining, in a preset reference frame, the prediction sample value of each sample unit based on the motion vector predictor of each sample unit.

For example, if the motion prediction mode of the to-be-encoded unit is the affine motion prediction mode, as shown in FIG. 2, there may be two control points in the to-be-encoded unit: the upper-left vertex of the to-be-encoded unit and the upper-right vertex of the to-be-encoded unit.

For example, the image encoding apparatus may determine the motion vector predictor of each sample unit in the to-be-encoded unit by using the following formula (5) and based on motion vector predictors, in the optimal motion vector group, of the two control points and the sample coordinates of each sample unit:

$$\begin{cases} v_x = \dfrac{(v_{x1} - v_{x0})}{w} x - \dfrac{(v_{y1} - v_{y0})}{w} y + v_{x0} \\ v_y = \dfrac{(v_{y1} - v_{y0})}{w} x + \dfrac{(v_{x1} - v_{x0})}{w} y + v_{y0} \end{cases} \qquad \text{formula (5)}$$

where $(v_x, v_y)$ is the motion vector predictor of each sample unit, where $v_x$ is a horizontal component of the motion vector predictor of each sample unit, and $v_y$ is a vertical component of the motion vector predictor of each sample unit; (x,y) are the sample coordinates of each sample unit, where x is a horizontal sample coordinate of each sample unit, and y is a vertical sample coordinate of each sample unit; and w is a horizontal width of the to-be-encoded unit.

S105: Determine a prediction residual of each sample unit based on a difference between an original sample value of each sample unit and the prediction sample value of each sample unit.

S106: Encode the prediction residual of each sample unit and an index identifier of the optimal motion vector group, to obtain a bitstream corresponding to the to-be-encoded unit, where the index identifier of the optimal motion vector group is used to instruct a decoding apparatus to determine the prediction sample value of each sample unit.

Specifically, in S106, encoding may be performed after transformation (Transformation) and quantization (Quantization) are sequentially performed on the prediction residual of each sample unit and the index identifier of the optimal motion vector group, to obtain the bitstream corresponding to the to-be-encoded unit.

The transformation may be any one of Karhunen-Loève Transform (KLT), Discrete Fourier Transform, Discrete Cosine Transform (DCT), and the like. The encoding may be entropy encoding.

Optionally, in S106, the prediction residual of each sample unit, the index identifier of the optimal motion vector group, and an index identifier of the preset reference frame may be encoded to obtain the bitstream corresponding to the to-be-encoded unit.

Optionally, in S106, the prediction residual of each sample unit, the index identifier of the optimal motion vector group, an index identifier of the preset reference frame, and the indication information corresponding to the motion prediction mode of the to-be-encoded unit may be encoded to obtain the bitstream corresponding to the to-be-encoded unit.

Because the N encoded units are encoded units, in the adjacent encoded units of the to-be-encoded unit, that have a same motion prediction mode, a motion correlation between the N encoded units and the to-be-encoded unit is relatively high. Because the N motion vector groups are determined based on motion vectors of the N encoded units, the motion vector predictor, determined based on the optimal motion vector group in the N motion vector groups, of each sample unit in the to-be-encoded unit are more accurate, so that encoding precision is higher.

In addition, the optimal motion vector group may be determined from the preset quantity of motion vector groups in the front of the candidate motion vector queue, and the candidate motion vector queue is generated based on the sorted N motion vector groups. Therefore, the index identifier of the optimal motion vector group in the candidate motion vector queue is relatively small, so that a quantity of bits used to encode the index identifier of the optimal motion vector group is relatively small, and encoding efficiency is improved.

According to the image encoding method provided in Embodiment 1 of the present invention, the N encoded units may be determined from the adjacent encoded units of the to-be-encoded unit according to the first preset rule, where the motion prediction mode of the N encoded units is the same as that of the to-be-encoded unit; the motion vector group is generated by using the first preset algorithm and based on the motion vector of the $n^{th}$ encoded unit, where n comprises any positive integer not greater than N; one motion vector group is determined, as the optimal motion vector group, from the obtained N motion vector groups according to the second preset rule; the prediction sample value of each sample unit in the to-be-encoded unit is determined by using the second preset algorithm and based on the optimal motion vector group; the prediction residual of each sample unit is determined based on the difference between the original sample value of each sample unit and the prediction sample value of each sample unit; and the prediction residual of each sample unit and the index identifier of the optimal motion vector group are encoded, to obtain the bitstream corresponding to the to-be-encoded unit. Because the motion prediction mode of the N encoded units is the same as that of the to-be-encoded unit, the motion correlation between the N encoded units and the to-be-encoded unit is relatively high. In addition, the optimal motion vector group is determined from the N motion vector groups that are determined based on the motion vectors of the N encoded units. Therefore, the prediction sample value, determined based on the optimal motion vector group, of each sample unit in the to-be-encoded unit is more accurate, so that accuracy of image encoding is higher.

Figure 3:
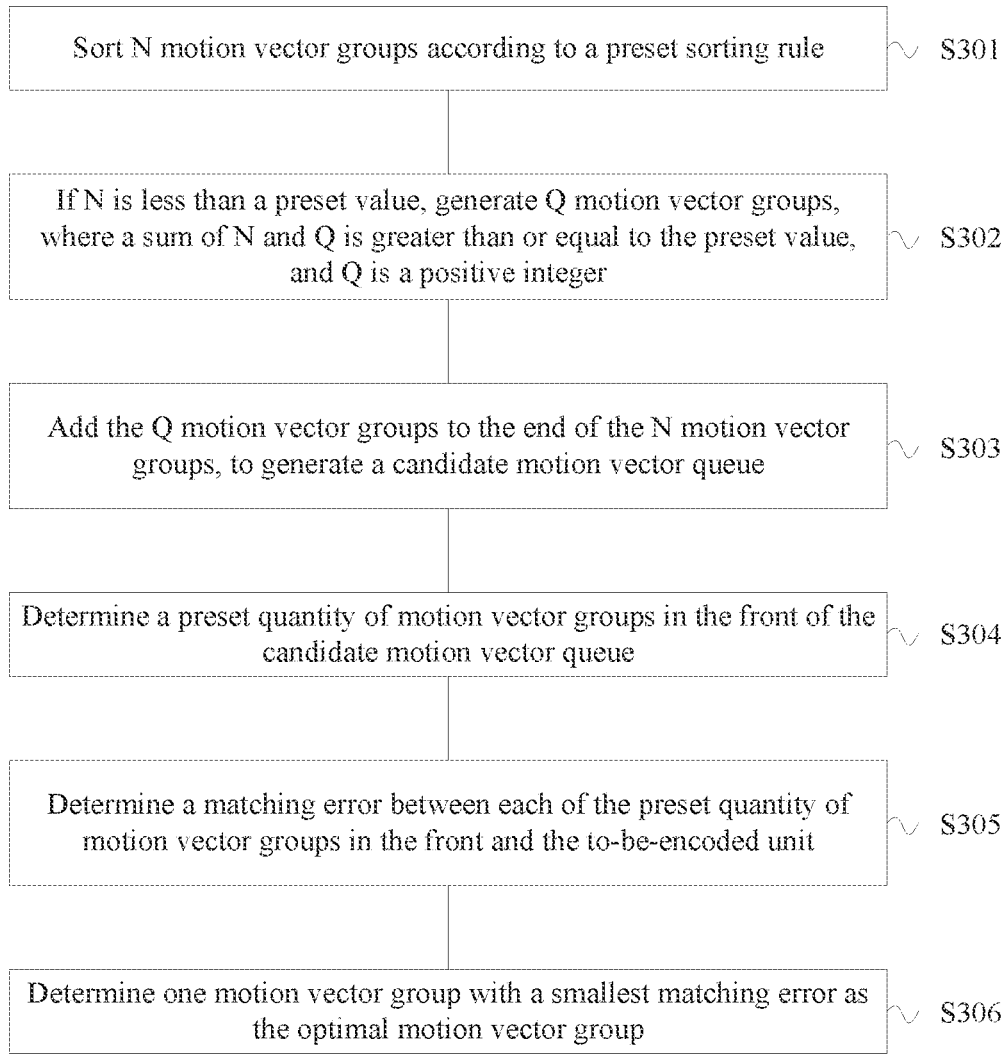
FIG. 3 is a flowchart of an image encoding method according to Embodiment 2 of the present invention.

Embodiment 2 of the present invention further provides an image encoding method. FIG. 3 is a flowchart of an image encoding method according to Embodiment 2 of the present invention. As shown in FIG. 3, according to the method, the determining, from obtained N motion vector groups according to a second preset rule, one motion vector group as an optimal motion vector group in S103 in the foregoing embodiment may include the following steps.

S301: Sort the N motion vector groups according to a preset sorting rule.

For example, the preset sorting rule may be an ascending or descending order of the N encoded units.

S302: If N is less than a preset value, generate Q motion vector groups, where a sum of N and Q is greater than or equal to the preset value, and Q is a positive integer.

If N is less than the preset value, the Q motion vector groups need to be further generated to ensure a quantity of motion vector groups in the candidate motion vector queue, so as to ensure accuracy of the selected optimal motion vector group.

Optionally; the generating Q motion vector groups in S302 may include:

determining, from the adjacent encoded units, an encoded unit corresponding to an $m^{th}$ control point in the to-be-encoded unit, where a distance between the encoded unit corresponding to the $m^{th}$ control point and the $m^{th}$ control point is less than or equal to a preset distance, and m comprises any positive integer not greater than M;

determining a motion vector of the encoded unit corresponding to the $m^{th}$ control point as a motion vector predictor of the $m^{th}$ control point; and generating the Q motion vector groups based on the motion vector predictors of the M control points.

For example, as shown in FIG. 2, if the adjacent encoded units include the encoded unit A, the encoded unit B, the encoded unit C, the encoded unit D, and the encoded unit E, and there are two control points in the to-be-encoded unit, an encoded unit, in the adjacent encoded units, corresponding to the upper-left vertex of the to-be-encoded unit may include the encoded unit C, and an encoded unit, in the adjacent encoded units, corresponding to the upper-right vertex of the to-be-encoded unit may include the encoded unit D and the encoded unit E.

For example, if the encoded unit corresponding to the upper-left vertex of the to-be-encoded unit may include the encoded unit C, a motion vector predictor of the upper-left vertex may be $v_0^C$. $v_0^C$ may be a motion vector predictor, of the upper-left vertex, determined based on a motion vector of the encoded unit C.

For example, if the encoded unit corresponding to the upper-right vertex of the to-be-encoded unit may include the encoded unit D and the encoded unit E, a motion vector predictor of the upper-right vertex may be $v_1^D$, and another motion vector predictor of the upper-right vertex may be $v_1^E$. $v_1^D$ may be a motion vector predictor, of the upper-right vertex, determined based on a motion vector of the encoded unit D. $v_1^E$ may be a motion vector predictor, of the upper-right vertex, determined based on a motion vector of the encoded unit E.

The Q motion vector groups may include two motion vector groups: $(v_0^C, v_1^D)$ and $(v_0^C, v_1^E)$. For example, Q may be 2.

Alternatively, the generating Q motion vector groups in S302 may include:
  determining, from the adjacent encoded units, an encoded unit corresponding to an $m^{th}$ control point in the to-be-encoded unit, where a distance between the encoded unit corresponding to the $m^{th}$ control point and the $m^{th}$ control point is less than or equal to a preset distance, and m comprises any positive integer not greater than M;
  determining a motion vector of the encoded unit corresponding to the $m^{th}$ control point as a first motion vector predictor of the $m^{th}$ control point;
  generating K first motion vector groups based on first motion vector predictors of the M control points;
  determining a motion vector of a $j^{th}$ encoded unit in the adjacent encoded units as a second motion vector predictor of the $m^{th}$ control point, where j is any one of 1, . . . , or J, J is a quantity of the adjacent encoded units, and J is a positive integer;
  generating L second motion vector groups based on second motion vector predictors of the M control points; and
  adding the K first motion vector groups to the end of the L second motion vector groups, to generate the Q motion vector groups.

Specifically, the Q motion vector groups may be generated in a plurality of times. For example, the K first motion vector groups are generated, and then the L second motion vector groups are generated.

S303: Add the Q motion vector groups to the end of the N motion vector groups, to generate a candidate motion vector queue.

S304: Determine a preset quantity of motion vector groups in the front of the candidate motion vector queue.

An implementation process of determining a preset quantity of motion vector groups in the front of the candidate motion vector queue in S304 is similar to that in Embodiment 1. Details are not described herein again.

S305: Determine a matching error between each of the preset quantity of motion vector groups in the front and the to-be-encoded unit.

A specific implementation process of determining a matching error between each motion vector group and the to-be-encoded to in S305 is similar to that in Embodiment 1. Details are not described herein again.

S306: Determine one motion vector group with a smallest matching error as the optimal motion vector group.

Optionally, the adding the Q motion vector groups to the end of the N motion vector groups, to generate a candidate motion vector queue in S303 may include:
  determining an eigenvalue corresponding to a $q^{th}$ motion vector group, where q comprises any positive integer not greater than Q;
  sorting the Q motion vector groups in ascending order based on eigenvalues corresponding to the Q motion vector groups; and
  adding the sorted Q motion vector groups to the end of the sorted N motion vector groups, to generate the candidate motion vector queue.

Optionally, the determining an eigenvalue corresponding to a $q^{th}$ motion vector group may include:
  determining a difference between components, in one prediction direction, of motion vector predictors, in the $q^{th}$ motion vector group, of adjacent control points in the M control points;
  comparing an absolute value of the difference with a preset component threshold, where the preset component threshold is a range of the to-be-encoded unit in the prediction direction; and
  if the absolute value of the difference is less than or equal to the preset component threshold, determining the eigenvalue corresponding to the $q^{th}$ motion vector group.

Specifically, the preset component threshold may be determined based on a horizontal width of the to-be-encoded unit in a horizontal prediction direction, or the preset component threshold may be determined based on a vertical height of the to-be-encoded unit in a vertical prediction direction.

For example, if the M control points of the to-be-encoded unit include in the upper-left vertex of the to-be-encoded unit and the upper-right vertex, as shown in FIG. 2, the Q motion vector groups may include two motion vector groups: $(v_0^C, v_1^D)$ and $(v_0^C, v_1^E)$, where $v_0^C$ is a motion vector predictor of the upper-left vertex of the to-be-encoded unit, and both $v_1^D$ and $v_1^E$ are motion vector predictors of the upper-right vertex of the to-be-encoded unit.

For example, in this embodiment, the difference between the components, in one prediction direction, of the motion vector predictors of the adjacent control points in the M control points may be compared with the preset component threshold based on the following formula (6):

$$\begin{cases} |v_{x0}^i - v_{x1}^j| \le \dfrac{w}{2} \\ |v_{y0}^i - v_{y1}^j| \le \dfrac{h}{2} \end{cases} \quad \text{formula (6)}$$

where $v_{x0}^i$ is a component, in the horizontal prediction direction, of the motion vector predictor of the upper-left vertex; $v_{y0}^i$ is a component, in the vertical prediction direction, of the motion vector predictor of the upper-left vertex; $v_{x1}^i$ is a component, in the horizontal prediction direction, of the motion vector predictor of the upper-right vertex; $v_{y1}^i$ is a component, in the vertical prediction direction, of the motion vector predictor of the upper-right vertex; i may be C, and j may be any one of D and E; w is the horizontal width of the to-be-encoded unit; and h is the vertical height of the to-be-encoded unit.

If i is C, j is any one of D and E, an absolute value of a difference between $v_{x0}^i$ and $v_{x1}^i$ is less than or equal to $$\frac{w}{2},$$

and an absolute value of a difference between $v_{y0}{}^i$ and $v_{y1}{}^i$ is less than or equal to $$\frac{h}{2},$$

the motion vector groups $(v_0{}^C, v_1{}^D)$ and $(v_0{}^C, v_1{}^E)$ are sorted.

Optionally, the determining an eigenvalue corresponding to a $q^{th}$ motion vector group may include:

determining, from the adjacent encoded units, an encoded unit corresponding to another control point, where a distance between the encoded unit corresponding to the another control point and the another control point is less than or equal to the preset distance, and the another control point is any control point other than the M control points in the to-be-encoded unit;

determining a motion vector of the encoded unit corresponding to the another control point as a motion vector predictor of the another control point; and determining the eigenvalue corresponding to the $q^{th}$ motion vector group by using a third preset algorithm and based on the motion vector predictor of the another control point and motion vector predictors, in the $q^{th}$ motion vector group, of the M control points.

For example, if the M control points in the to-be-encoded unit may include the upper-left vertex and the upper-right vertex of the to-be-encoded unit, the another control point may be the lower-left vertex of the to-be-encoded unit, for example, a sample unit 5 of the to-be-encoded unit in FIG. 2.

The encoded unit corresponding to the another control point may include the encoded unit A and the encoded unit B. Therefore, a motion vector of the encoded unit A may be determined as a enation vector predictor $v_5{}^A$ of the another control point, and a motion vector of the encoded unit B may be determined as a motion vector predictor $v_5{}^B$ of the another control point.

For example, in this embodiment, the eigenvalue corresponding to the $q^{th}$ motion vector group may be determined by using the following formula (7) and based on the motion vector predictor of the another control point and motion vector predictors, in the $q^{th}$ motion vector group, of the M control points:

$$D(V) = \text{abs}((v_{x1}{}^i - v_{x0}{}^i) \times h - (v_{y5}{}^k - v_{x0}{}^i) \times w) + \text{abs}((v_{y1}{}^i - v_{y0}{}^i) \times h + (v_{x5}{}^k - v_{x0}{}^i) \times w) \quad \text{formula (7)}$$

where $D(V)$ is the eigenvalue corresponding to the $q^{th}$ motion vector group; abs is an absolute value function; $v_{x5}{}^k$ is a component, in the horizontal prediction direction, of the motion vector predictor of the another control point such as the lower-left vertex; $v_{y5}{}^k$ is a component, in the vertical prediction direction, of the motion vector predictor of the another control point such as the lower-left vertex; and k may be any one of A and B.

Optionally; the motion prediction mode of the to-be-encoded unit may include a translation motion prediction mode or the affine motion prediction mode.

If the motion prediction mode of the to-be-encoded unit includes the translation motion prediction mode, the quantity of the control points, namely. M, may be 1. If the motion prediction mode of the to-be-encoded unit includes the affine motion prediction mode, the quantity of the control points, namely, M, may be greater than 1.

Embodiment 2 of the present invention provides a plurality of implementation processes of determining the candidate motion vector queue. Therefore, it can be better ensured that the prediction sample value, determined based on the optimal motion vector group selected from the candidate motion vector queue, of each sample unit in the to-be-encoded unit is more accurate, so that the encoding precision is higher, the quantity of bits used to encode the index identifier of the optimal motion vector group is relatively small, and the encoding efficiency is improved.

Figure 4:
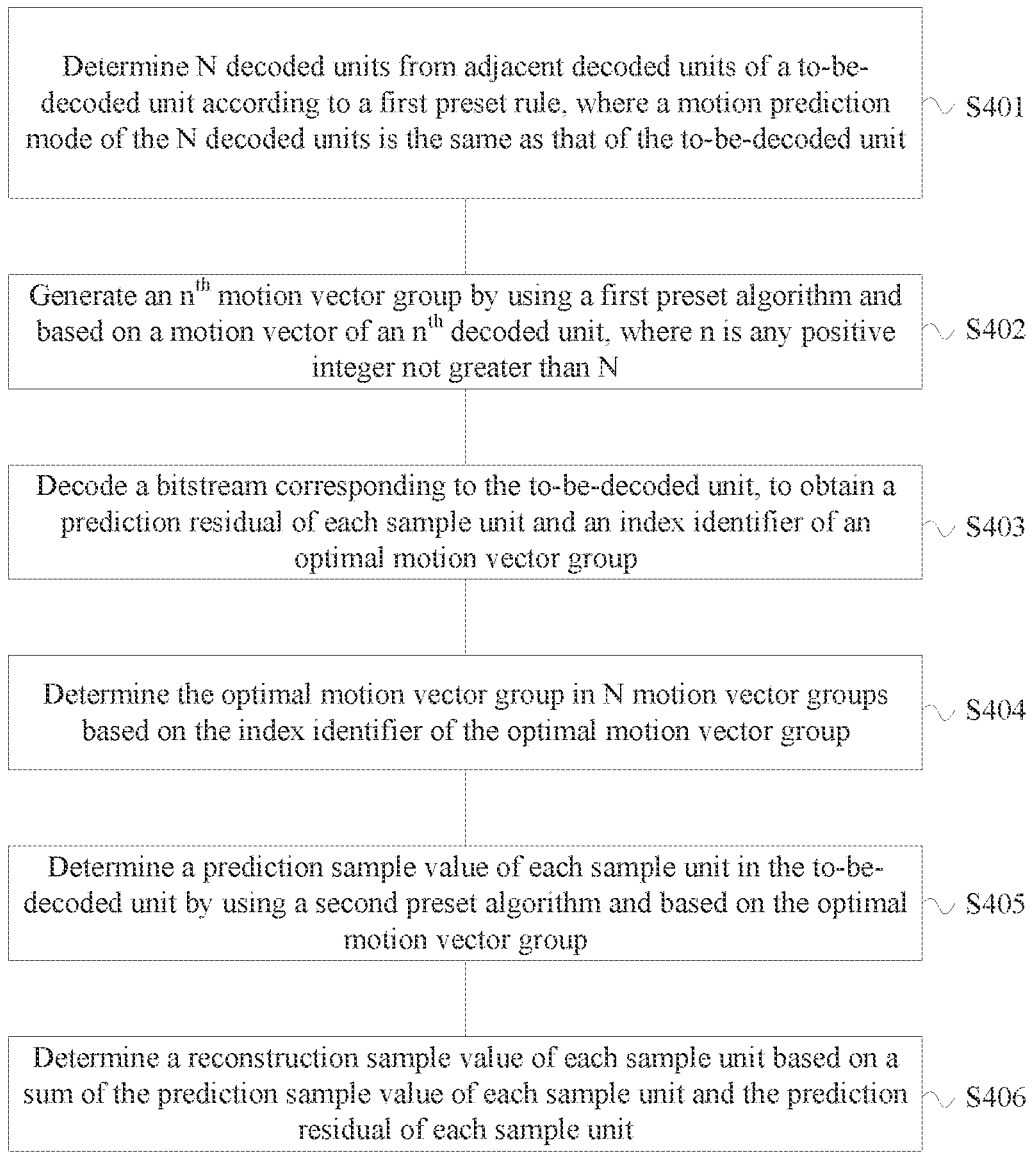
FIG. 4 is a flowchart of an image decoding method according to Embodiment 3 of the present invention.

Embodiment 3 of the present invention provides an image decoding method. The image decoding method is a decoding method corresponding to the foregoing image encoding method. The image decoding method may be performed by an image decoding apparatus. For example, the image decoding apparatus may be integrated, in a form of software and/or hardware, in an electronic device with an image processing function. For example, the electronic device may be an intelligent terminal, a personal computer, a consumer electronic product, or a video server. FIG. 4 is a flowchart of an image decoding method according to Embodiment 3 of the present invention. As shown in FIG. 4, the method may include the following steps.

S401: Determine N decoded units from adjacent decoded units of a to-be-decoded unit according to a first preset rule, where a motion prediction mode of the N decoded units is the same as that of the to-be-decoded unit.

A specific implementation process of S401 is similar to that of S101 in the foregoing embodiment. Details are not described herein again.

Before the determining N decoded units from adjacent decoded units of a to-be-decoded unit according to first preset rule in S401, the method may further include:

determining the motion prediction mode of the to-be-decoded unit.

Specifically, the determining the motion prediction mode of the to-be-decoded unit may include: parsing a syntactic element corresponding to the to-be-decoded unit, to obtain the motion prediction mode of the to-be-decoded unit. If a syntactic element affine-merge-flag obtained after the parsing is 1, the motion prediction mode of the to-be-decoded unit is an affine motion prediction mode. If a syntactic element affine-merge-flag obtained after the parsing is 0, the motion prediction mode of the to-be-decoded unit is a translation motion prediction mode.

S402: Generate an $n^{th}$ motion vector group by using a first preset algorithm and based on a motion vector of an $n^{th}$ decoded unit, where n comprises any positive integer not greater than N.

A specific implementation process of S402 is similar to that of S102 in the foregoing embodiment. Details are not described herein again.

S403: Decode a bitstream corresponding to the to-be-decoded unit, to obtain a prediction residual of each sample unit and an index identifier of an optimal motion vector group.

Specifically, in S403, the bitstream corresponding to the to-be-decoded unit may be decoded, de-quantization and inverse transformation are sequentially performed on information obtained after the decoding, and further, the prediction residual of each sample unit and the index identifier of the optimal motion vector group are obtained. The inverse transformation may be inverse transformation corresponding to the transformation in S106 in the foregoing embodiment. The de-quantization may be de-quantization corresponding to the quantization in S106 in the foregoing embodiment. The decoding may be decoding corresponding to the encoding in S106, for example, decoding corresponding to the entropy encoding.

S404: Determine the optimal motion vector group in N motion vector groups based on the index identifier of the optimal motion vector group.

The index identifier of the optimal motion vector group may be an index number of the optimal motion vector group in the N motion vector groups.

S405: Determine a prediction sample value of each sample unit in the to-be-decoded unit by using a second preset algorithm and based on the optimal motion vector group.

A process of determining a prediction sample value of each sample unit in the to-be-decoded unit in S405 may be similar to that of S104 in the foregoing embodiment. Details are not described herein again.

S406: Determine a reconstruction sample value of each sample unit based on a sum of the prediction sample value of each sample unit and the prediction residual of each sample unit.

Optionally, the generating an $n^{th}$ motion vector group by using a first preset algorithm and based on a motion vector of an $n^{th}$ decoded unit in S402 may include:

determining motion vector predictors of M control points of the to-be-decoded unit by using the first preset algorithm and based on the motion vector of the $n^{th}$ decoded unit, sample coordinates of the $n^{th}$ decoded unit, and sample coordinates of the M control points; and generating the $n^{th}$ motion vector group based on the motion vector predictors of the M control points, where M is a positive integer determined based on the motion prediction mode of the to-be-decoded unit.

Optionally, the M control points include an upper-left vertex and an upper-right vertex of the to-be-decoded unit.

The determining motion vector predictors of M control points of the to-be-decoded unit by using the first preset algorithm and based on the motion vector of the $n^{th}$ decoded unit, sample coordinates of the $n^{th}$ decoded unit, and sample coordinates of the M control points may include:

determining a motion vector predictor ($v_{x0}$, $v_{y0}$) of the upper-left vertex of the to-be-decoded unit by using the following formula (1) and based on a motion vector ($v_{x2}$, $v_{y2}$) of an upper-left vertex of the $n^{th}$ decoded unit, a motion vector ($v_{x3}$, $v_{y3}$) of an upper-right vertex of the $n^{th}$ decoded unit, a motion vector ($v_{x4}$, $v_{y4}$) of a lower-left vertex of the $n^{th}$ decoded unit, sample coordinates ($x_2$, $y_2$) of the upper-left vertex of the $n^{th}$ decoded unit, sample coordinates ($x_3$, $y_3$) of the upper-right vertex of the $n^{th}$ decoded unit, sample coordinates ($x_4$, $y_4$) of the lower-left vertex of the $n^{th}$ decoded unit, and sample coordinates ($x_0$, $y_0$) of the upper-left vertex of the to-be-decoded unit:

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \quad \text{formula (1)}$$

and determining a motion vector predictor ($v_{x1}$, $v_{y1}$) of the upper-right vertex of the to-be-decoded unit by using the following formula (2) and based on the motion vector ($v_{x2}$, $v_{y2}$) of the upper-left vertex of the $n^{th}$ decoded unit, the motion vector ($v_{x3}$, $v_{y3}$) of the upper-right vertex of the $n^{th}$ decoded unit, the sample coordinates ($x_2$, $y_2$) of the upper-left vertex of the $n^{th}$ decoded unit, the sample coordinates ($x_3$, $y_3$) of the upper-right vertex of the $n^{th}$ decoded unit, the motion vector predictor ($v_{x0}$, $v_{y0}$) of the upper-left vertex of the to-be-decoded unit, the sample coordinates ($x_0$, $y_0$) of the upper-left vertex of the to-be-decoded unit, and sample coordinates ($x_1$, $y_1$) of the upper-left vertex of the to-be-decoded unit:

$$\begin{cases} v_{x1} = v_{x0} + \dfrac{(x_1 - x_0) \times (v_{x3} - v_{x2})}{(x_3 - x_2)} \\ v_{y1} = v_{y0} + \dfrac{(x_1 - x_0) \times (v_{y3} - v_{y2})}{(x_3 - x_2)} \end{cases} \quad \text{formula (2)}$$

Optionally, the determining the optimal motion vector group in N motion vector groups based on the index identifier of the optimal motion vector group in S404 may include:

sorting the N motion vector groups according to a preset sorting rule, to generate a candidate motion vector queue;

if N is greater than or equal to a preset value, determining a preset quantity of motion vector groups in the front of the candidate motion vector queue; and determining the optimal motion vector group in the preset quantity of motion vector groups in the front based on the index identifier of the optimal motion vector group.

Optionally, the preset sorting rule includes a descending order of the N decoded units.

Alternatively, the determining the optimal motion vector group in N motion vector groups based on the index identifier of the optimal motion vector group in S404 may include:

sorting the N motion vector groups according to a preset sorting rule;

if N is less than a preset value, generating Q motion vector groups, where a sum of N and Q is greater than or equal to the preset value, and Q is a positive integer;

adding the Q motion vector groups to the end of the N motion vector groups, to generate a candidate motion vector queue;

determining a preset quantity of motion vector groups in the front of the candidate motion vector queue; and determining the optimal motion vector group in the preset quantity of motion vector groups in the front based on the index identifier of the optimal motion vector group.

Optionally, the generating Q motion vector groups may include:

determining, from the adjacent decoded units, a decoded unit corresponding to an $m^{th}$ control point in the to-be-decoded unit, where a distance between the decoded unit corresponding to the $m^{th}$ control point and the $m^{th}$ control point is less than or equal to a preset distance, and m comprises any positive integer not greater than M;

determining a motion vector of the decoded unit corresponding to the $m^{th}$ control point as a motion vector predictor of the $m^{th}$ control point; and generating the Q motion vector groups based on the motion vector predictors of the M control points.

Optionally; the generating Q motion vector groups may include:

determining, from the adjacent decoded units, a decoded unit corresponding to an $m^{th}$ control point in the to-be-decoded unit, where a distance between the decoded unit corresponding to the $m^{th}$ control point and the $m^{th}$ control point is less than or equal to a preset distance, and m comprises any positive integer not greater than M;

determining a motion vector of the decoded unit corresponding to the $m^{th}$ control point as a first motion vector predictor of the $m^{th}$ control point;

generating K first motion vector groups based on first motion vector predictors of the M control points;

determining a motion vector of a $j^{th}$ decoded unit in the adjacent decoded units as a second motion vector predictor of the $m^{th}$ control point, where j is any one of 1, . . . , or J, J is a quantity of the adjacent decoded units, and J is a positive integer;

generating L second motion vector groups based on second motion vector predictors of the M control points; and adding the K first motion vector groups to the end of the L second motion vector groups, to generate the Q motion vector groups.

Optionally, the adding the Q motion vector groups to the end of the N motion vector groups, to generate a candidate motion vector queue may include:

determining an eigenvalue corresponding to a $q^{th}$ motion vector group, where q comprises any positive integer not greater than Q;

sorting the Q motion vector groups in ascending order based on eigen.values corresponding to the Q motion vector groups; and adding the sorted Q motion vector groups to the end of the sorted N motion vector groups; to generate the candidate motion vector queue.

Optionally, the determining an eigenvalue corresponding to a $q^{th}$ motion vector group includes:

determining a difference between components, in one prediction direction, of motion vector predictors, in the $q^{th}$ motion vector group, of adjacent control points in the M control points;

comparing an absolute value of the difference with a preset component threshold, where the preset component threshold is a range of the to-be-decoded unit in the prediction direction; and if the absolute value of the difference is less than or equal to the preset component threshold, determining the eigenvalue corresponding to the $q^{th}$ motion vector group.

Optionally, the determining an eigenvalue corresponding to a $q^{th}$ motion vector group may include:

determining, from the adjacent decoded units, a decoded unit corresponding to another control point, where a distance between the decoded unit corresponding to the another control point and the another control point is less than or equal to the preset distance, and the another control point is any control point other than the M control points in the to-be-decoded unit;

determining a motion vector of the decoded unit corresponding to the another control point as a motion vector predictor of the another control point; and determining the eigenvalue corresponding to the $q^{th}$ motion vector group by using a third preset algorithm and based on the motion vector predictor of the another control point and motion vector predictors, in the $q^{th}$ motion vector group, of the M control points.

Optionally, the motion prediction mode of the to-be-decoded unit includes the translation motion prediction mode or the amine motion prediction mode. If the motion prediction mode of the to-be-decoded unit includes the translation motion prediction mode, the quantity of the control points is 1. If the motion prediction mode of the to-be-decoded unit includes the affine motion prediction mode, the quantity of the control points is greater than 1.

The image decoding method provided in Embodiment 3 of the present invention is a decoding method corresponding to the image encoding method in Embodiment 1 and Embodiment 2. A beneficial effect of the image decoding method is similar to that of the foregoing embodiments. Details are not described herein again.

Figure 5:
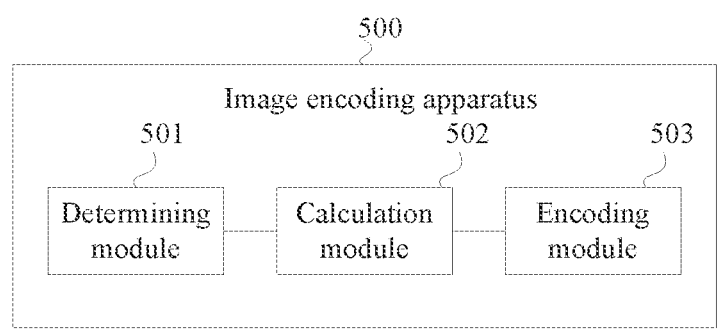
FIG. 5 is a schematic structural diagram of an image encoding apparatus according to Embodiment 4 of the present invention.

Embodiment 4 of the present invention provides an image encoding apparatus. FIG. 5 is a schematic structural diagram of an image encoding apparatus according to Embodiment 4 of the present invention. As shown in FIG. 5, the image encoding apparatus 500 includes a determining module 501, a calculation module 502, and an encoding module 503.

The determining module 501 is configured to determine N encoded units from adjacent encoded units of a to-be-encoded unit according to a first preset rule, where a motion prediction mode of the N encoded units is the same as that of the to-be-encoded unit, and N is a positive integer.

The calculation module 502 is configured to generate an $n^{th}$ motion vector group by using a first preset algorithm and based on a motion vector of an $n^{th}$ encoded unit determined by the determining module 501, where n comprises any positive integer not greater than N.

The determining module 501 is further configured to determine, from N motion vector groups obtained by the calculation module 502 and according to a second preset rule, one motion vector group as an optimal motion vector group.

The calculation module 502 is further configured to: determine a prediction sample value of each sample unit in the to-be-encoded unit by using a second preset algorithm and based on the optimal motion vector group determined by the determining module, and determine a prediction residual of each sample unit based on a difference between an original sample value of each sample unit and the prediction sample value of each sample unit.

The encoding module 503 is configured to encode the prediction residual of each sample unit and an index identifier of the optimal motion vector group, to obtain a bitstream corresponding to the to-be-encoded unit, where the index identifier of the optimal motion vector group is used to instruct a decoding apparatus to determine the prediction sample value of each sample unit.

Optionally, the calculation module 502 is specifically configured to: determine motion vector predictors of M control points of the to-be-encoded unit by using the first preset algorithm and based on the motion vector of the $n^{th}$ encoded unit determined by the determining module 501, sample coordinates of the $n^{th}$ encoded unit, and sample coordinates of the M control points; and generate the $n^{th}$ motion vector group based on the motion vector predictors of the M control points, where M is a positive integer determined based on the motion prediction mode of the to-be-encoded unit.

Optionally, the M control points include an upper-left vertex and an upper-right vertex of the to-be-encoded unit;

the calculation module 502 is specifically configured to determine a motion vector predictor $(v_{x0}, v_{y0})$ of the upper-left vertex of the to-be-encoded unit by using the following formula (1) and based on a motion vector $(v_{x2}, v_{y2})$ of an upper-left vertex of the $n^{th}$ encoded unit determined by the determining module 501, a motion vector $(v_{x3}, v_{y3})$ of an upper-right vertex of the $n^{th}$ encoded unit, a motion vector $(v_{x4}, v_{y4})$ of a lower-left vertex of the $n^{th}$ encoded unit, sample coordinates $(x_2, y_2)$ of the upper-left vertex of the $n^{th}$ encoded unit, sample coordinates $(x_3, y_3)$ of the upper-right vertex of the $n^{th}$ encoded unit, sample coordinates $(x_4, y_4)$ of the lower-left vertex of the $n^{th}$ encoded unit, and sample coordinates $(x_0, y_0)$ of the upper-left vertex of the to-be-encoded unit:

$$\begin{cases} v_{x0} = v_{x3} + \frac{(y_3 - y_0) \times (v_{x4} - v_{x2})}{(y_4 - y_2)} \\ v_{y0} = v_{y3} + \frac{(y_3 - y_0) \times (v_{y4} - v_{y2})}{(y_4 - y_2)} \end{cases} ; \quad \text{formula (1)}$$

and the calculation module 502 is further configured to determine a motion vector predictor $(v_{x1}, v_{y1})$ of the upper-right vertex of the to-be-encoded unit by using the following formula (2) and based on the motion vector $(v_{x2}, v_{y2})$ of the upper-left vertex of the $n^{th}$ encoded unit determined by the determining module 501, the motion vector $(v_{x3}, v_{y3})$ of the upper-right vertex of the $n^{th}$ encoded unit, the sample coordinates $(x_2, y_2)$ of the upper-left vertex of the $n^{th}$ encoded unit, the sample coordinates $(x_3, y_3)$ of the upper-right vertex of the $n^{th}$ encoded unit, the motion vector predictor $(v_{x0}, v_{y0})$ of the upper-left vertex of the to-be-encoded unit, the sample coordinates $(x_0, y_0)$ of the upper-left vertex of the to-be-encoded unit, and sample coordinates $(x_1, y_1)$ of the upper-left vertex of the to-be-encoded unit:

$$\begin{cases} v_{x1} = v_{x0} + \frac{(x_1 - x_0) \times (v_{x3} - v_{x2})}{(x_3 - x_2)} \\ v_{y1} = v_{y0} + \frac{(x_1 - x_0) \times (v_{y3} - v_{y2})}{(x_3 - x_2)} \end{cases} . \quad \text{formula (2)}$$

Optionally, the determining module 501 is specifically configured to: sort the N motion vector groups according to a preset sorting rule, to generate a candidate motion vector queue; if N is greater than or equal to a preset value, determine a preset quantity of motion vector groups in the front of the candidate motion vector queue; determine a matching error between each of the preset quantity of motion vector groups in the front and the to-be-encoded unit, and determine one motion vector group with a smallest matching error as the optimal motion vector group.

Optionally, the preset sorting rule includes a descending order of the N encoded units.

Optionally, the determining module 501 is further configured to: sort the N motion vector groups according to a preset sorting rule; if N is less than a preset value, generate Q motion vector groups, where a sum of N and Q is greater than or equal to the preset value, and Q is a positive integer; add the Q motion vector groups to the end of the N motion vector groups, to generate a candidate motion vector queue; determine a preset quantity of motion vector groups in the front of the candidate motion vector queue; determine a matching error between each of the preset quantity of motion vector groups in the front and the to-be-encoded unit; and determine one motion vector group with a smallest matching error as the optimal motion vector group.

Optionally, the determining module 501 is further configured to: determine, from the adjacent encoded units, an encoded unit corresponding to an $m^{th}$ control point in the to-be-encoded unit, where a distance between the encoded unit corresponding to the $m^{th}$ control point and the $m^{th}$ control point is less than or equal to a preset distance, and m comprises any positive integer not greater than M; determine a motion vector of the encoded unit corresponding to the $m^{th}$ control point as a motion vector predictor of the $m^{th}$ control point and generate the Q motion vector groups based on the motion vector predictors of the M control points.

Optionally, the determining module 501 is further configured to: determine, from the adjacent encoded units, an encoded unit corresponding to an $m^{th}$ control point in the to-be-encoded unit, where a distance between the encoded unit corresponding to the re control point and the $m^{th}$ control point is less than or equal to a preset distance, and m comprises any positive integer not greater than M; determine a motion vector of the encoded unit corresponding to the $m^{th}$ control point as a first motion vector predictor of the $m^{th}$ control point; generate K first motion vector groups based on first motion vector predictors of the M control points; determine a motion vector of a $j^{th}$ encoded unit in the adjacent encoded units as a second motion vector predictor of the $m^{th}$ control point, where j is any one of 1, . . . , or J, J is a quantity of the adjacent encoded units, and J is a positive integer; generate L second motion vector groups based on second motion vector predictors of the M control points; and add the K first motion vector groups to the end of the L second motion vector groups, to generate the Q motion vector groups.

Optionally, the determining module 501 is further configured to: determine an eigen value corresponding to a $q^{th}$ motion vector group, where q comprises any positive integer not greater than Q; sort the Q motion vector groups in ascending order based on eigenvalues corresponding to the Q motion vector groups; and add the sorted Q motion vector groups to the end of the sorted N motion vector groups, to generate the candidate motion vector queue.

Optionally, the determining module 501 is further configured to: determine a difference between components, in one prediction direction, of motion vector predictors, in the $q^{th}$ motion vector group, of adjacent control points in the M control points; compare an absolute value of the difference with a preset component threshold, where the preset component threshold is a range of the to-be-encoded unit in the prediction direction; and if the absolute value of the difference is less than or equal to the preset component threshold, determine the eigenvalue corresponding to the $q^{th}$ motion vector group.

Optionally, the determining module 501 is further configured to: determine, from the adjacent encoded units, an encoded unit corresponding to another control point, where a distance between the encoded unit corresponding to the another control point and the another control point is less than or equal to the preset distance, and the another control point is any control point other than the M control points in the to-be-encoded unit; determine a motion vector of the encoded unit corresponding to the another control point as a motion vector predictor of the another control point; and determine the eigenvalue corresponding to the $q^{th}$ motion vector group by using a third preset algorithm and based on the motion vector predictor of the another control point and motion vector predictors, in the $q^{th}$ motion vector group, of the M control points.

Optionally, the motion prediction mode of the to-be-encoded unit includes a translation motion prediction mode or an affine motion prediction mode.

The image encoding apparatus provided in Embodiment 4 of the present invention may be configured to perform the image encoding method in any one of Embodiment 1 or Embodiment 2. A specific implementation process and a beneficial effect are similar to those of the foregoing embodiments. Details are not described herein again.

Figure 6:
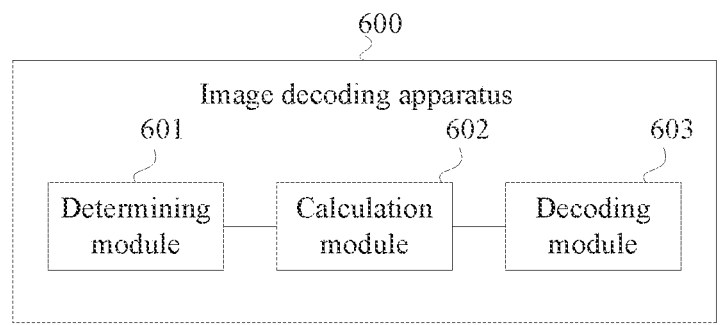
FIG. 6 is a schematic structural diagram of an image decoding apparatus according to Embodiment 5 of the present invention.

Embodiment 5 of the present invention further provides an image decoding apparatus. FIG. 6 is a schematic structural diagram of an image decoding apparatus according to Embodiment 5 of the present invention. As shown in FIG. 6, the image decoding apparatus 600 may include a determining module 601, a calculation module 602, and a decoding module 603.

The determining module 601 is configured to determine N decoded units from adjacent decoded units of a to-be-decoded unit according to a first preset rule, where a motion prediction mode of the N decoded units is the same as that of the to-be-decoded unit, and N is a positive integer.

The calculation module 602 is configured to generate an $n^{th}$ motion vector group by using a first preset algorithm and based on a motion vector of an $n^{th}$ decoded unit determined by the determining module 601, where n comprises any positive integer not greater than N.

The decoding module 603 is configured to decode a bitstream corresponding to the to-be-decoded unit, to obtain a prediction residual of each sample unit and an index identifier of an optimal motion vector group.

The determining module 601 is further configured to determine the optimal motion vector group in N motion vector groups based on the index identifier of the optimal motion vector group that is determined by the decoding module 603.

The calculation module 602 is further configured to: determine a prediction sample value of each sample unit in the to-be-decoded unit by using a second preset algorithm and based on the optimal motion vector group determined by the determining module 601, and determine a reconstruction sample value of each sample unit based on a sum of the prediction sample value of each sample unit and the prediction residual of each sample unit.

Optionally, the calculation module 602 is specifically configured to: determine motion vector predictors of M control points of the to-be-decoded unit by using the first preset algorithm and based on the motion vector of the $n^{th}$ decoded unit determined by the determining module 601, sample coordinates of the $n^{th}$ decoded unit, and sample coordinates of the M control points; and generate the $n^{th}$ motion vector group based on the motion vector predictors of the M control points, where M is a positive integer determined based on the motion prediction mode of the to-be-decoded unit.

Optionally, the M control points include an upper-left vertex and an upper-right vertex of the to-be-decoded unit;

the calculation module 602 is specifically configured to determine a motion vector predictor ($v_{x0}$, $v_{y0}$) of the upper-left vertex of the to-be-decoded unit by using the following formula (1) and based on a motion vector ($v_{x2}$, $v_{y2}$) of an upper-left vertex of the $n^{th}$ decoded unit determined by the determining module 601, a motion vector ($v_{x3}$, $v_{y3}$) of an upper-right vertex of the $n^{th}$ decoded unit, a motion vector ($v_{x4}$, $v_{y4}$) of a lower-left vertex of the $n^{th}$ decoded unit, sample coordinates ($x_2$, $y_2$) of the upper-left vertex of the $n^{th}$ decoded unit, sample coordinates ($x_3$, $y_3$) of the upper-right vertex of the $n^{th}$ decoded unit; sample coordinates ($x_4$, $y_4$) of the lower-left vertex of the $n^{th}$ decoded unit, and sample coordinates ($x_0$, $y_0$) of the upper-left vertex of the to-be-decoded unit:

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \quad \text{formula (1)}$$

and specifically; the calculation module 602 is further configured to determine a motion vector predictor ($v_{x1}$, $v_{y1}$) of the upper-right vertex of the to-be-decoded unit by using the following formula (2) and based on the motion vector ($v_{x2}$, $v_{y2}$) of the upper-left vertex of the $n^{th}$ decoded unit determined by the determining module 601, the motion vector ($v_{x3}$, $v_{y3}$) of the upper-right vertex of the $n^{th}$ decoded unit, the sample coordinates ($x_2$, $y_2$) of the upper-left vertex of the $n^{th}$ decoded unit, the sample coordinates ($x_3$, $y_3$) of the upper-right vertex of the $n^{th}$ decoded unit, the motion vector predictor ($v_{x0}$, $v_{y0}$) of the upper-left vertex of the to-be-decoded unit, the sample coordinates ($x_0$, $y_0$) of the upper-left vertex of the to-be-decoded decoded unit, and sample coordinates ($x_1$, $y_1$) of the upper-left vertex of the to-be-decoded unit:

$$\begin{cases} v_{x1} = v_{x0} + \dfrac{(x_1 - x_0) \times (v_{x3} - v_{x2})}{(x_3 - x_2)} \\ v_{y1} = v_{y0} + \dfrac{(x_1 - x_0) \times (v_{y3} - v_{y2})}{(x_3 - x_2)} \end{cases} \quad \text{formula (2)}$$

Optionally, the determining module 601 is further configured to: sort the N motion vector groups according to a preset sorting rule, to generate a candidate motion vector queue; if N is greater than or equal to a preset value, determine a preset quantity of motion vector groups in the front of the candidate motion vector queue; and determine the optimal motion vector group in the preset quantity of motion vector groups in the front based on the index identifier of the optimal motion vector group.

Optionally, the preset sorting rule includes a descending order of the N decoded units.

Optionally, the determining module 601 is further configured to: sort the N motion vector groups according to a preset sorting rule; if N is less than a preset value, generate Q motion vector groups, where a sum of N and Q is greater than or equal to the preset value, and Q is a positive integer; add the Q motion vector groups to the end of the N motion vector groups, to generate a candidate motion vector queue; determine a preset quantity of motion vector groups in the front of the candidate motion vector queue; and determine the optimal motion vector group in the preset quantity of motion vector groups in the front based on the index identifier of the optimal motion vector group.

Optionally; the determining module 601 is further configured to: determine, from the adjacent decoded units, a decoded unit corresponding to an $m^{th}$ control point in the to-be-decoded unit, where a distance between the decoded unit corresponding to the $m^{th}$ control point and the $m^{th}$ control point is less than or equal to a preset distance, and m comprises any positive integer not greater than M; determine a motion vector of the decoded unit corresponding to the $m^{th}$ control point as a motion vector predictor of the $m^{th}$ control point; and generate the Q motion vector groups based on the motion vector predictors of the M control points.

Optionally, the determining module 601 is further configured to: determine, from the adjacent decoded units, a decoded unit corresponding to an $m^{th}$ control point in the to-be-decoded unit, where a distance between the decoded unit corresponding to the $m^{th}$ control point and the $m^{th}$ control point is less than or equal to a preset distance, and m comprises any positive integer not greater than M; determine a motion vector of the decoded unit corresponding to the $m^{th}$ control point as a first motion vector predictor of the $m^{th}$ control point; generate K first motion vector groups based on first motion vector predictors of the M control points; determine a motion vector of a $j^{th}$ decoded unit in the adjacent decoded units as a second motion vector predictor of the $m^{th}$ control point, where j is any one of 1, . . . , or J, J is a quantity of the adjacent decoded units, and J is a positive integer; generate L second motion vector groups based on second motion vector predictors of the M control points; and add the K first motion vector groups to the end of the L second motion vector groups, to generate the Q motion vector groups.

Optionally; the determining module 601 is further configured to: determine an eigenvalue corresponding to a $q^{th}$ motion vector group, where q comprises any positive integer not greater than Q; sort the Q motion vector groups in ascending order based on eigenvalues corresponding to the Q motion vector groups; and add the sorted Q motion vector groups to the end of the sorted N motion vector groups, to generate the candidate motion vector queue.

Optionally, the determining module 601 is further configured to: determine a difference between components, in one prediction direction, of motion vector predictors, in the $q^{th}$ motion vector group, of adjacent control points in the M control points; compare an absolute value of the difference with a preset component threshold, where the preset component threshold is a range of the to-be-decoded unit in the prediction direction; and if the absolute value of the difference is less than or equal to the preset component threshold, determine the eigen value corresponding to the $q^{th}$ motion vector group.

Optionally, the determining module 601 is further configured to: determine; from the adjacent decoded units, a decoded unit corresponding to another control point, where a distance between the decoded unit corresponding to the another control point and the another control point is less than or equal to the preset distance, and the another control point is any control point other than the M control points in the to-be-decoded unit; determine a motion vector of the decoded unit corresponding to the another control point as a motion vector predictor of the another control point; and determine the eigenvalue corresponding to the $q^{th}$ motion vector group by using a third preset algorithm and based on the motion vector predictor of the another control point and motion vector predictors, in the $q^{th}$ motion vector group, of the M control points.

Optionally, the motion prediction mode of the to-be-decoded unit includes a translation motion prediction mode or an affine motion prediction mode.

The image decoding apparatus provided in Embodiment 5 of the present invention may perform the image decoding method provided in Embodiment 3. A specific implementation process and a beneficial effect are similar to those of the foregoing embodiment. Details are not described herein again.

Figure 7:
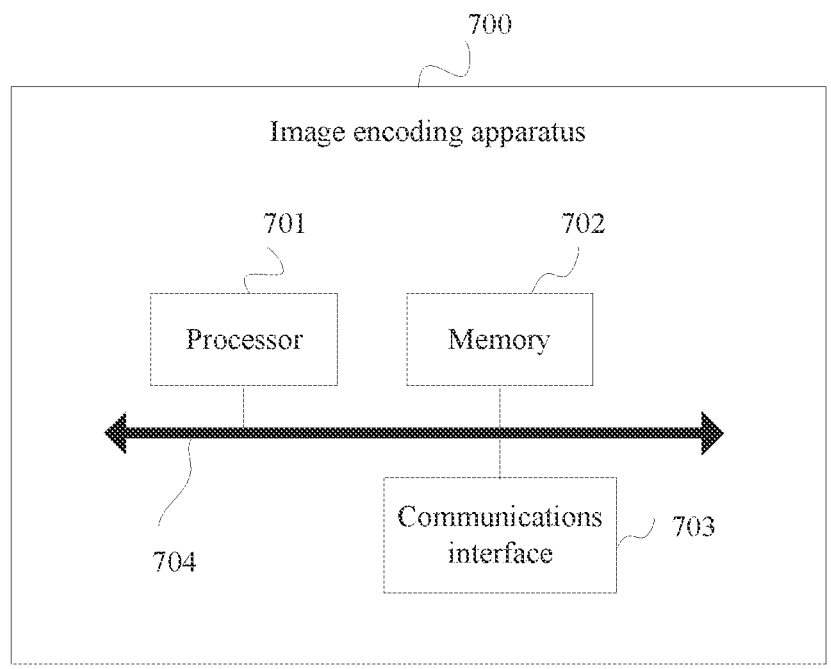
FIG. 7 is a schematic structural diagram of an image encoding apparatus according to Embodiment 6 of the present invention.

Embodiment 6 of the present invention provides an image encoding apparatus. FIG. 7 is a schematic structural diagram of an image encoding apparatus according to Embodiment 6 of the present invention. As shown in FIG. 7, the image encoding apparatus 700 includes a processor 701, a memory 702, a communications interface 703, and a bus 704. The processor 701 is connected to the memory 702 and the communications interface 703 by using the bus 704.

The memory 702 is configured to store an instruction.

The processor 701 is configured to execute the instruction. When the processor 701 executes the instruction stored in the memory 702, the processor 701 performs the image encoding method in any one of Embodiment 1 or Embodiment 2.

The image encoding apparatus provided in Embodiment 6 of the present invention may perform the image encoding method provided in Embodiment 1 or Embodiment 2. A specific implementation process and a beneficial effect are similar to those of the foregoing embodiments. Details are not described herein again.

Figure 8:
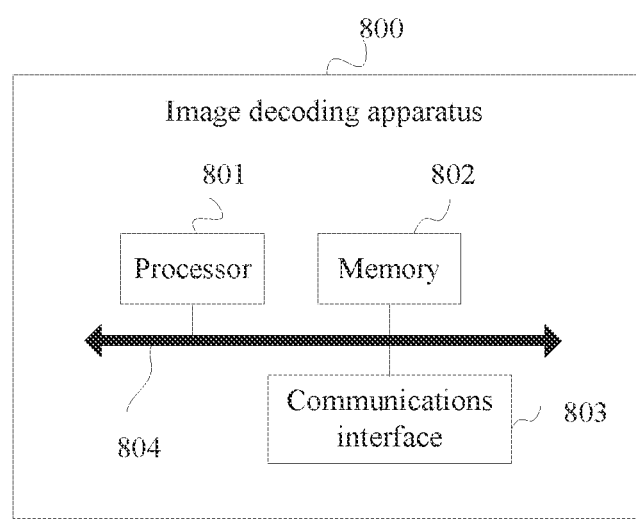
FIG. 8 is a schematic structural diagram of an image decoding apparatus according to Embodiment 7 of the present invention.

Embodiment 7 of the present invention provides an image decoding apparatus. FIG. 8 is a schematic structural diagram of an image decoding apparatus according to Embodiment 7 of the present invention. As shown in FIG. 8, the image decoding apparatus 800 may include a processor 801, a memory 802, a communications interface 803, and a bus 804. The processor 801 is connected to the memory 802 and the communications interface 803 by using the bus 804.

The memory 802 is configured to store an instruction.

The processor 801 is configured to execute the instruction. When the processor 801 executes the instruction stored in the memory 802, the processor 801 performs the image decoding method in Embodiment 3.

The image decoding apparatus provided in Embodiment 7 of the present invention may perform the image decoding method provided in Embodiment 3. A specific implementation process and a beneficial effect are similar to those of the foregoing embodiment. Details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An image decoding method, wherein the method comprises:
    determining, from two decoded units that are adjacent to a to-be-decoded unit and that are on a left side of the to-be-decoded unit, a first decoded unit that is first found according to a first preset traversal sequence and whose motion prediction mode is the same as that of the to-be-decoded unit; determining, from three decoded units that are adjacent to the to-be-decoded unit and that are above the to-be-decoded unit, a second decoded unit that is first found according to a second preset traversal sequence and whose motion prediction mode is the same as that of the to-be-decoded unit, wherein the motion prediction mode of the first decoded unit, the motion prediction mode of the second decoded unit and the motion prediction mode of the to-be-decoded unit are affine motion prediction mode, wherein the first preset traversal sequence is independent from the second preset traversal sequence, the first preset traversal sequence is a sequence of the two decoded units on the left side of the to-be-decoded unit, and the second preset traversal sequence is a sequence of the three decoded units above the to-be-decoded unit;

calculating first motion vector predictors of M control points of the to-be-decoded unit based on motion vectors of a plurality of control points of the first decoded unit, sample coordinates of the plurality of control points of the first decoded unit, and sample coordinates of the M control points; generating a first motion vector group based on the first motion vector predictors of the M control points; calculating second motion vector predictors of the M control points based on motion vectors of a plurality of control points of the second decoded unit, sample coordinates of the plurality of control points of the second decoded unit, and the sample coordinates of the M control points; generating a second motion vector group based on the second motion vector predictors of the M control points; determining a target motion vector group from a plurality of motion vector groups, wherein the plurality of motion vector groups comprise the first motion vector group and the second motion vector group; and predicting the to-be-decoded unit based on the target motion vector group.

2. The method according to claim 1, wherein determining the target motion vector group from the plurality of motion vector groups comprises:
generating Q motion vector groups, wherein Q is a first value; and
determining the target motion vector group from the Q motion vector groups, the first motion vector group, and the second motion vector group.

3. The method according to claim 2, wherein Q+2 is greater than or equal to a preset value.

4. The method according to claim 2, wherein generating the Q motion vector groups comprises:
generating, based on motion vectors of decoded units respectively corresponding to the M control points, the Q motion vector groups.

5. The method according to claim 1, wherein determining the target motion vector group from the plurality of motion vector groups comprises:
obtaining an index identifier of an optimal motion vector group; and
determining the target motion vector group from the plurality of motion vector groups based on the index identifier of the optimal motion vector group.

6. The method according to claim 1, wherein M is a positive integer determined based on the motion prediction mode of the to-be-decoded unit.

7. The method according to claim 1, wherein calculating the first motion vector predictors of M control points based on motion vectors of the plurality of control points of the first decoded unit, sample coordinates of the plurality of control points of the first decoded unit, and sample coordinates of the M control points comprises:
determining a motion vector predictor $(v_{x0}, v_{y0})$ of an upper-left control point of the to-be-decoded unit by using the following formula (1) and based on a motion vector $(v_{x2}, v_{y2})$ of an upper-left control point of the first decoded unit, a motion vector $(v_{x3}, v_{y3})$ of an upper-right control point of the first decoded unit, a motion vector $(v_{x4}, v_{y4})$ of a lower-left control point of the first decoded unit, sample coordinates $(X_2, y_2)$ of the upper-left control point of the first decoded unit, sample coordinates $(x_3, y_3)$ of the upper-right control point of the first decoded unit, sample coordinates $(x_4, y_4)$ of the lower-left control point of the first decoded unit, and sample coordinates $(x_0, y_0)$ of the upper-left control point of the to-be-decoded unit, wherein the upper-left control point of the to-be-decoded unit belongs to the M control points;

$$\begin{cases} v_{x0} = v_{x3} + \frac{(y_3 - y_0) \times (v_{x4} - v_{x2})}{(y_4 - y_2)} \\ v_{y0} = v_{y3} + \frac{(y_3 - y_0) \times (v_{y4} - v_{y2})}{(y_4 - y_2)} \end{cases} \quad \text{formula (1)}$$

8. The method according to claim 1, wherein calculating the second motion vector predictors of the M control points based on motion vectors of the plurality of control points of the second decoded unit, sample coordinates of the plurality of control points of the second decoded unit, and the sample coordinates of the M control points comprises:
determining a motion vector predictor $(v_{x0}, v_{y0})$ of an upper-left control point of the to-be-decoded unit by using the following formula (1) and based on a motion vector $(v_{x2}, v_{y2})$ of an upper-left control point of the second decoded unit, a motion vector $(v_{x3}, v_{y3})$ of an upper-right control point of the second decoded unit, a motion vector $(v_{x4}, v_{y4})$ of a lower-left control point of the second decoded unit, sample coordinates $(x_2, y_2)$ of the upper-left control point of the second decoded unit, sample coordinates $(x_3, Y_3)$ of the upper-right control point of the second decoded unit, sample coordinates $(x_4, y_4)$ of the lower-left control point of the second decoded unit, and sample coordinates $(x_0, y_0)$ of the upper-left control point of the to-be-decoded unit, wherein the upper-left control point of the to-be-decoded unit belongs to the M control points;

$$\begin{cases} v_{x0} = v_{x3} + \frac{(y_3 - y_0) \times (v_{x4} - v_{x2})}{(y_4 - y_2)} \\ v_{y0} = v_{y3} + \frac{(y_3 - y_0) \times (v_{y4} - v_{y2})}{(y_4 - y_2)} \end{cases} \quad \text{formula (1)}$$

9. An image encoding method, comprising:
determining, from two encoded units that are adjacent to a to-be-encoded unit and that are on a left side of the to-be-encoded unit, a first encoded unit that is first found according to a first preset traversal sequence and whose motion prediction mode is the same as that of the to-be-encoded unit; determining, from three encoded units that are adjacent to the to-be-encoded unit and that are above the to-be-encoded unit, a second encoded unit that is first found according to a second preset traversal sequence and whose motion prediction mode is the same as that of the to-be-encoded unit, wherein the motion prediction mode of the first encoded unit, the motion prediction mode of the second encoded unit and the motion prediction mode of the to-be-encoded unit are affine motion prediction mode, wherein the first preset traversal sequence is independent from the second preset traversal sequence, the first preset traversal sequence is a sequence of the two encoded units on the left side of the to-be-encoded unit, and the second preset traversal sequence is a sequence of the three encoded units above the to-be-encoded unit;

calculating first motion vector predictors of M control points of the to-be-encoded unit based on motion vectors of a plurality of control points of the first encoded unit, sample coordinates of the plurality of control points of the first encoded unit, and sample coordinates of the M control points, and generating a first motion vector group based on the first motion vector predictors of the M control points; calculating second motion vector predictors of the M control points based on motion vectors of a plurality of control points of the second encoded unit, sample coordinates of the plurality of control points of the second encoded unit, and the sample coordinates of the M control points, and generating a second motion vector group based on the second motion vector predictors of the M control points; determining a target motion vector group from a plurality of motion vector groups, wherein the plurality of motion vector groups comprise the first motion vector group and the second motion vector group; and predicting the to-be-encoded unit based on the target motion vector group.

10. The method according to claim 9, wherein determining the target motion vector group from the plurality of motion vector groups comprises:
generating Q motion vector groups, wherein Q is a first value; and
determining the target motion vector group from the Q motion vector groups, the first motion vector group, and the second motion vector group.

11. The method according to claim 10, wherein Q+2 is greater than or equal to a preset value.

12. The method according to claim 10, wherein generating the Q motion vector groups comprises:
generating, based on motion vectors of encoded units respectively corresponding to the M control points, the Q motion vector groups.

13. The method according to claim 9, wherein the method further comprises:
determining an index identifier of the target motion vector group based on the plurality of motion vector groups and the target motion vector group; and
encoding the index identifier into a bitstream.

14. The method according to claim 9, wherein M is a positive integer determined based on the motion prediction mode of the to-be-encoded unit.

15. The method according to claim 9, wherein calculating the first motion vector predictors of M control points based on motion vectors of the plurality of control points of the first encoded unit, sample coordinates of the plurality of control points of the first encoded unit, and sample coordinates of the M control points comprises:
determining a motion vector predictor ($v_{x0}$, $v_{y0}$) of an upper-left control point of the to-be-encoded unit by using the following formula (1) and based on a motion vector ($v_{x2}$, $v_{y2}$) of an upper-left control point of the first encoded unit, a motion vector ($v_{x3}$, $v_{y3}$) of an upper-right control point of the first encoded unit, a motion vector ($v_{x4}$, $v_{y4}$) of a lower-left control point of the first encoded unit, sample coordinates ($x_2$, $y_2$) of the upper-left control point of the first encoded unit, sample coordinates ($x_3$, $y_3$) of the upper-right control point of the first encoded unit, sample coordinates ($x_4$, $y_4$) of the lower-left control point of the first encoded unit, and sample coordinates ($x_0$, $y_0$) of the upper-left control point of the to-be-encoded unit, wherein the upper-left control point of the to-be-encoded unit belongs to the M control points;

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \qquad \text{formula (1)}$$

16. The method according to claim 9, wherein calculating the second motion vector predictors of the M control points based on motion vectors of the plurality of control points of the second encoded unit, sample coordinates of the plurality of control points of the second encoded unit, and the sample coordinates of the M control points comprises:
determining a motion vector predictor ($v_{x0}$, $v_{y0}$) of an upper-left control point of the to-be-encoded unit by using the following formula (1) and based on a motion vector ($v_{x2}$, $v_{y2}$) of an upper-left control point of the second encoded unit, a motion vector ($v_{x3}$, $v_{y3}$) of an upper-right control point of the second encoded unit, a motion vector ($v_{x4}$, $v_{y4}$) of a lower-left control point of the second encoded unit, sample coordinates ($x_2$, $Y_2$) of the upper-left control point of the second encoded unit, sample coordinates ($x_3$, $Y_3$) of the upper-right control point of the second encoded unit, sample coordinates ($x_4$, $y_4$) of the lower-left control point of the second encoded unit, and sample coordinates ($x_0$, $y_0$) of the upper-left control point of the to-be-encoded unit, wherein the upper-left control point of the to-be-encoded unit belongs to the M control points;

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \qquad \text{formula (1)}$$

17. An image decoding apparatus, comprising: at least one processor; and
a non-transitory computer-readable storage medium coupled to the at least one processor and storing programming instructions for execution by the at least one processor, wherein the programming instructions instruct the at least one processor to: determine, from two decoded units that are adjacent to a to-be-decoded unit and that are on a left side of the to-be-decoded unit, a first decoded unit that is first found according to a first preset traversal sequence and whose motion prediction mode is the same as that of the to-be-decoded unit; determine, from three decoded units that are adjacent to the to-be-decoded unit and that are above the to-be-decoded unit, a second decoded unit that is first found according to a second preset traversal sequence and whose motion prediction mode is the same as that of the to-be-decoded unit, wherein the motion prediction mode of the first decoded unit, the motion prediction mode of the second decoded unit and the motion prediction mode of the to-be-decoded unit are affine motion prediction mode, wherein the first preset traversal sequence is independent from the second preset traversal sequence, the first preset traversal sequence is a sequence of the two decoded units on the left side of the to-be-decoded unit, and the second preset traversal sequence is a sequence of the three decoded units above the to-be-decoded unit; calculate first motion vector predictors of M control points of the to-be-decoded unit based on motion vectors of a plurality of control points of the first decoded unit, sample coordinates of the plurality of control points of the first decoded unit, and sample coordinates; generate a first motion vector group based on the first motion vector predictors of the M control points; calculate second motion vector predictors of the M control points based on motion vectors of a plurality of control points of the second decoded unit, sample coordinates of the plurality of control points of the second decoded unit, and the sample coordinates of the M control points; generate a second motion vector group based on the second motion vector predictors of the M control points; determine a target motion vector group from a plurality of motion vector groups, wherein the plurality of motion vector groups comprise the first motion vector group and the second motion vector group; and predict the to-be-decoded unit based on the target motion vector group.

18. The apparatus according to claim 17, wherein the programming instructions instruct the at least one processor to:
generate Q motion vector groups, wherein Q is a first value, and Q+2 is greater than or equal to a preset value; and
determine the target motion vector group from the Q motion vector groups, the first motion vector group, and the second motion vector group.

19. The apparatus according to claim 18, wherein the programming instructions instruct the at least one processor to:
generate the Q motion vector groups, based on motion vectors of decoded units respectively corresponding to the M control points.

20. The apparatus according to claim 17, wherein the programming instructions instruct the at least one processor to:
obtain an index identifier of an optimal motion vector group; and
determine the target motion vector group from the plurality of motion vector groups based on the index identifier of the optimal motion vector group.

21. The apparatus according to claim 17, wherein M is a positive integer determined based on the motion prediction mode of the to-be-decoded unit.

22. The apparatus according to claim 17, wherein the programming instructions instruct the at least one processor to:
determine a motion vector predictor ($v_{x0}$, $v_{y0}$) of an upper-left control point of the to-be-decoded unit by using the following formula (1) and based on a motion vector ($v_{x2}$, $v_{y2}$) of an upper-left control point of the first decoded unit, a motion vector ($v_{x3}$, $v_{y3}$) of an upper-right control point of the first decoded unit, a motion vector ($v_{x4}$, $v_{y4}$) of a lower-left control point of the first decoded unit, sample coordinates ($x_2$, $y_2$) of the upper-left control point of the first decoded unit, sample coordinates ($x_3$, $y_3$) of the upper-right control point of the first decoded unit, sample coordinates ($x_4$, $y_4$) of the lower-left control point of the first decoded unit, and sample coordinates ($x_0$, $y_0$) of the upper-left control point of the to-be-decoded unit, wherein the upper-left control point of the to-be-decoded unit belongs to the M control points; or
determine a motion vector predictor ($v_{x0}$, $v_{y0}$) of an upper-left control point of the to-be-decoded unit by using the following formula (1) and based on a motion vector ($v_{x2}$, $v_{y2}$) of an upper-left control point of the second decoded unit, a motion vector ($v_{r3}$, $v_{y3}$) of an upper-right control point of the second decoded unit, a motion vector ($v_{x4}$, $v_{y4}$) of a lower-left control point of the second decoded unit, sample coordinates ($X_2$, $y_2$) of the upper-left control point of the second decoded unit, sample coordinates ($x_3$, $y_3$) of the upper-right control point of the second decoded unit, sample coordinates ($x_4$, $y_4$) of the lower-left control point of the second decoded unit, and sample coordinates ($x_0$, $y_0$) of the upper-left control point of the to-be-decoded unit, wherein the upper-left control point of the to-be-decoded unit belongs to the M control points;

$$\begin{cases} v_{x0} = v_{x3} + \dfrac{(y_3 - y_0) \times (v_{x4} - v_{x2})}{(y_4 - y_2)} \\ v_{y0} = v_{y3} + \dfrac{(y_3 - y_0) \times (v_{y4} - v_{y2})}{(y_4 - y_2)} \end{cases} \quad \text{formula (1)}$$

23. An image encoding apparatus, comprising: at least one processor; and
a non-transitory computer-readable storage medium coupled to the at least one processor and storing programming instructions for execution by the at least one processor, wherein the programming instructions instruct the at least one processor to: determine, from two encoded units that are adjacent to a to-be-encoded unit and that are on a left side of the to-be-encoded unit, a first encoded unit that is first found according to a first preset traversal sequence and whose motion prediction mode is the same as that of the to-be-encoded unit; determine, from three encoded units that are adjacent to the to-be-encoded unit and that are above the to-be-encoded unit, a second encoded unit that is first found according to a second preset traversal sequence and whose motion prediction mode is the same as that of the to-be-encoded unit, wherein the motion prediction mode of the first encoded unit, the motion prediction mode of the second encoded unit and the motion prediction mode of the to-be-encoded unit are affine motion prediction mode, wherein the first preset traversal sequence is independent from the second preset traversal sequence, the first preset traversal sequence is a sequence of the two encoded units on the left side of the to-be-encoded unit, and the second preset traversal sequence is a sequence of the three encoded units above the to-be-encoded unit; calculate first motion vector predictors of M control points of the to-be-encoded unit based on motion vectors of a plurality of control points of the first encoded unit, sample coordinates of the plurality of control points of the first encoded unit, and sample coordinates of the M control points; generate a first motion vector group based on the first motion vector predictors of the M control points; calculate second motion vector predictors of the M control points based on motion vectors of a plurality of control points of the second encoded unit, sample coordinates of the plurality of control points of the second encoded unit, and the sample coordinates of the M control points; generate a second motion vector group based on the second motion vector predictors of the M control points;
determine a target motion vector group from a plurality of motion vector groups, wherein the plurality of motion vector groups comprise the first motion vector group and the second motion vector group; and predict the to-be-encoded unit based on the target motion vector group.

24. The apparatus according to claim 23, wherein the programming instructions instruct the at least one processor to:
  generate Q motion vector groups, wherein Q is a first value, and Q+2 is greater than or equal to a preset value; and
  determine the target motion vector group from the Q motion vector groups, the first motion vector group, and the second motion vector group.

25. The apparatus according to claim 24, wherein the programming instructions instruct the at least one processor to:
  generate the Q motion vector groups based on motion vectors of encoded units respectively corresponding to the M control points.

26. The apparatus according to claim 23, wherein the programming instructions instruct the at least one processor to determine an index identifier of the target motion vector group based on the plurality of motion vector groups and the target motion vector group, and encode the index identifier into a bitstream.

27. The apparatus according to claim 23, wherein M is a positive integer determined based on the motion prediction mode of the to-be-encoded unit.

28. The apparatus according to claim 23, wherein the programming instructions instruct the at least one processor to:
  determine a motion vector predictor $(v_{x0}, v_{y0})$ of an upper-left control point of the to-be-encoded unit by using the following formula (1) and based on a motion vector $(v_{x2}, v_{y2})$ of an upper-left control point of the first encoded unit, a motion vector $(v_{x3}, v_{y3})$ of an upper-right control point of the first encoded unit, a motion vector $(v_{x4}, v_{y4})$ of a lower-left control point of the first encoded unit, sample coordinates $(x_2, y_2)$ of the upper-left control point of the first encoded unit, sample coordinates $(x_3, y_3)$ of the upper-right control point of the first encoded unit, sample coordinates $(x_4, y_4)$ of the lower-left control point of the first encoded unit, and sample coordinates $(x_0, y_0)$ of the upper-left control point of the to-be-encoded unit, wherein the upper-left control point of the to-be-encoded unit belongs to the M control points; or
  determine a motion vector predictor $(Vx_0, Vy_0)$ of an upper-left control point of the to-be-encoded unit by using the following formula (1) and based on a motion vector $(v_{x2}, v_{y2})$ of an upper-left control point of the second encoded unit, a motion vector $(v_{x3}, v_{y3})$ of an upper-right control point of the second encoded unit, a motion vector $(v_{x4}, v_{y4})$ of a lower-left control point of the second encoded unit, sample coordinates $(x_2, y_2)$ of the upper-left control point of the second encoded unit, sample coordinates $(x_3, y_3)$ of the upper-right control point of the second encoded unit, sample coordinates $(x_4, y_4)$ of the lower-left control point of the second encoded unit, and sample coordinates $(x_0, y_0)$ of the upper-left control point of the to-be-encoded unit, wherein the upper-left control point of the to-be-encoded unit belongs to the M control points;

$$\begin{cases} v_{x0} = v_{x3} + \frac{(y_3 - y_0) \times (v_{x4} - v_{x2})}{(y_4 - y_2)} \\ v_{y0} = v_{y3} + \frac{(y_3 - y_0) \times (v_{y4} - v_{y2})}{(y_4 - y_2)} \end{cases} \quad \text{formula (1)}$$

29. A non-transitory, computer-readable medium storing one or more instructions executable by a computer system to perform operations comprising:
  determining, from two decoded units that are adjacent to a to-be-decoded unit and that are on a left side of the to-be-decoded unit, a first decoded unit that is first found according to a first preset traversal sequence and whose motion prediction mode is the same as that of the to-be-decoded unit; determining, from three decoded units that are adjacent to the to-be-decoded unit and that are above the to-be-decoded unit, a second decoded unit that is first found according to a second preset traversal sequence and whose motion prediction mode is the same as that of the to-be-decoded unit, wherein the motion prediction mode of the first decoded unit, the motion prediction mode of the second decoded unit and the motion prediction mode of the to-be-decoded unit are affine motion prediction mode, wherein the first preset traversal sequence is independent from the second preset traversal sequence, the first preset traversal sequence is a sequence of the two decoded units on the left side of the to-be-decoded unit, and the second preset traversal sequence is a sequence of the three decoded units above the to-be-decoded unit;
  calculating first motion vector predictors of M control points of the to-be-decoded unit based on motion vectors of a plurality of control points of the first decoded unit, sample coordinates of the plurality of control points of the first decoded unit, and sample coordinates of the M control points; generating a first motion vector group based on the first motion vector predictors of the M control points; calculating second motion vector predictors of the M control points based on motion vectors of a plurality of control points of the second decoded unit, sample coordinates of the plurality of control points of the second decoded unit, and the sample coordinates of the M control points; generating a second motion vector group based on the second motion vector predictors of the M control points; determining a target motion vector group from a plurality of motion vector groups, wherein the plurality of motion vector groups comprise the first motion vector group and the second motion vector group, wherein the target motion vector group is indicated by an index identifier obtained from a bitstream; and predicting the to-be-decoded unit based on the target motion vector group.

30. A non-transitory, computer-readable medium storing one or more instructions executable by a computer system to perform operations comprising:
  determining, from two encoded units that are adjacent to a to-be-encoded unit and that are on a left side of the to-be-encoded unit, a first encoded unit that is first found according to a first preset traversal sequence and whose motion prediction mode is the same as that of the to-be-encoded unit; determining, from three encoded units that are adjacent to the to-be-encoded unit and that are above the to-be-encoded unit, a second encoded unit that is first found according to a second preset traversal sequence and whose motion prediction mode is the same as that of the to-be-encoded unit, wherein the motion prediction mode of the first encoded unit, the motion prediction mode of the second encoded unit and the motion prediction mode of the to-be-encoded unit are affine motion prediction mode, wherein the first preset traversal sequence is independent from the preset traversal second sequence, the first preset traversal sequence is a sequence of the two encoded units on the left side of the to-be-encoded unit, and the second preset traversal sequence is a sequence of the three encoded units above the to-be-encoded unit;

calculating first motion vector predictors of M control points of the to-be-encoded unit based on motion vectors of a plurality of control points of the first encoded unit, sample coordinates of the plurality of control points of the first encoded unit, and sample coordinates of the M control points; generating a first motion vector group based on the first motion vector predictors of the M control points; calculating second motion vector predictors of the M control points based on motion vectors of a plurality of control points of the second encoded unit, sample coordinates of the plurality of control points of the second encoded unit, and the sample coordinates of the M control points; generating a second motion vector group based on the second motion vector predictors of the M control points; determining a target motion vector group from a plurality of motion vector groups, wherein the plurality of motion vector groups comprise the first motion vector group and the second motion vector group; and generating a bitstream including an index identifier of the target motion vector group.

* * * * *

UNITED STATES PATENT AND TRADEMARK OFFICE
CERTIFICATE OF CORRECTION

PATENT NO. : 12,401,819 B2  
APPLICATION NO. : 17/843030  
DATED : August 26, 2025  
INVENTOR(S) : Huanbang Chen, Sixin Lin and Haitao Yang Page 1 of 1

It is certified that error appears in the above-identified patent and that said Letters Patent is hereby corrected as shown below:

In the Claims

In Column 37, In Line 66, In Claim 7, delete "($X_2$," and insert -- ($x_2$, --.

In Column 38, In Line 31, In Claim 8, delete "$Y_3$)" and insert -- $y_3$) --.

In Column 40, In Line 21, In Claim 16, delete "$Y_2$)" and insert -- $y_2$) --.

In Column 40, In Line 23, In Claim 16, delete "$Y_3$)" and insert -- $y_3$) --.

In Column 41, In Line 66, In Claim 22, delete "($v_{r3}$," and insert -- ($v_{x3}$, --.

In Column 42, In Line 2, In Claim 22, delete "($X_2$," and insert -- ($x_2$, --.

In Column 43, In Line 44 (Approx.), In Claim 28, delete "($V_{x0}$, $V_{y0}$)" and insert -- ($v_{x0}$, $v_{y0}$) --.

Signed and Sealed this  
Sixth Day of January, 2026

John A. Squires  
*Director of the United States Patent and Trademark Office*